US011347781B2

(12) United States Patent
George et al.

(10) Patent No.: US 11,347,781 B2
(45) Date of Patent: May 31, 2022

(54) DYNAMICALLY GENERATING ATTRIBUTION-MODEL VISUALIZATIONS FOR DISPLAY IN ATTRIBUTION USER INTERFACES

(71) Applicant: Adobe Inc., San Jose, CA (US)

(72) Inventors: William Brandon George, Pleasant Grove, UT (US); Trevor Paulsen, Lehi, UT (US); Jordan Walker, Lehi, UT (US)

(73) Assignee: Adobe Inc., San Jose, CA (US)

( * ) Notice: Subject to any disclaimer, the term of this patent is extended or adjusted under 35 U.S.C. 154(b) by 612 days.

(21) Appl. No.: 16/167,143

(22) Filed: Oct. 22, 2018

(65) Prior Publication Data

US 2020/0125676 A1 Apr. 23, 2020

(51) Int. Cl.
*G06F 16/33* (2019.01)
*G06F 16/332* (2019.01)
*G06F 17/18* (2006.01)
*G06Q 30/02* (2012.01)
*G06N 20/00* (2019.01)
*G06F 16/901* (2019.01)

(52) U.S. Cl.
CPC ...... *G06F 16/3328* (2019.01); *G06F 16/9024* (2019.01); *G06F 17/18* (2013.01); *G06N 20/00* (2019.01); *G06Q 30/0201* (2013.01)

(58) Field of Classification Search
CPC .................. G06F 16/3328; G06F 16/9024
See application file for complete search history.

(56) References Cited

U.S. PATENT DOCUMENTS 7,212,625 B1 5/2007 McKenna et al.
9,697,316 B1 7/2017 Taylor et al.
(Continued)

OTHER PUBLICATIONS

U.S. Appl. No. 16/189,812, Sep. 28, 2021, Office Action.
(Continued)

*Primary Examiner* — Eliyah S. Harper
(74) *Attorney, Agent, or Firm* — Keller Preece PLLC

(57) ABSTRACT

This disclosure relates to methods, non-transitory computer readable media, and systems that provide an attribution user interface that integrates attribution models as native components within the interface to configure analytics visualizations. By integrating attribution models and corresponding functions as native components of a user interface, the disclosed methods, non-transitory computer readable media, and systems can implement attribution models as parameters of attribution distributions or of any attribution visualizations, where the attribution models function as event categories. For instance, the disclosed methods, non-transitory computer readable media, and systems can provide analytics tools to generate visualizations of different attribution distributions of events across dimension values (or other visualizations) based on different attribution models. In some implementations, the disclosed methods, non-transitory computer readable media, and systems can also modify an attribution-distribution visualization extemporaneously given user inputs for a new event category, new dimension, new segment, or other parameter for the visualization.

20 Claims, 21 Drawing Sheets

(56) References Cited

U.S. PATENT DOCUMENTS

| | | |
|---|---|---|
| 10,169,778 B1* | 1/2019 | Collin ............... G06Q 30/0246 |
| 10,332,156 B2 | 6/2019 | Buchalter et al. |
| 10,599,642 B1 | 3/2020 | Hawes et al. |
| 10,659,403 B2 | 5/2020 | Smullen et al. |
| 10,970,338 B2* | 4/2021 | Paulsen ............... G06F 16/248 |
| 2002/0116249 A1* | 8/2002 | Ellinger ............... G06Q 30/02 |
| | | 705/7.33 |
| 2007/0198505 A1* | 8/2007 | Fuller ............... G06F 16/9537 |
| 2008/0288889 A1 | 11/2008 | Hunt et al. |
| 2010/0131441 A1 | 5/2010 | Gruenhagen et al. |
| 2010/0217650 A1 | 8/2010 | Hartnell |
| 2011/0302025 A1 | 12/2011 | Hsiao et al. |
| 2011/0320715 A1 | 12/2011 | Ickman et al. |
| 2012/0046996 A1 | 2/2012 | Shah et al. |
| 2012/0226527 A1* | 9/2012 | Carwile, Jr. ......... G06Q 10/107 |
| | | 705/7.38 |
| 2012/0303447 A1 | 11/2012 | Hughes et al. |
| 2013/0035975 A1 | 2/2013 | Cavander et al. |
| 2013/0111350 A1 | 5/2013 | Ishii |
| 2013/0301820 A1 | 11/2013 | Williams et al. |
| 2014/0195339 A1 | 7/2014 | Paulsen et al. |
| 2014/0244345 A1* | 8/2014 | Sollis ............... G06Q 30/02 |
| | | 705/7.29 |
| 2014/0279057 A1 | 9/2014 | Shepherd et al. |
| 2015/0032725 A1 | 1/2015 | Barykin et al. |
| 2015/0046828 A1 | 2/2015 | Desai et al. |
| 2015/0161652 A1 | 6/2015 | Schnabl et al. |
| 2016/0042388 A1 | 2/2016 | Chater |
| 2016/0063427 A1* | 3/2016 | Xu ............... G06Q 10/06398 |
| | | 705/7.42 |
| 2016/0098735 A1 | 4/2016 | Sinha et al. |
| 2016/0189207 A1* | 6/2016 | Xu ............... G06Q 30/0249 |
| | | 705/14.48 |
| 2016/0283969 A1 | 9/2016 | Chalimadugu et al. |
| 2017/0017971 A1 | 1/2017 | Moreau et al. |
| 2017/0039577 A1 | 2/2017 | Gauthier et al. |
| 2017/0046734 A1* | 2/2017 | Chittilappilly ..... G06Q 30/0246 |
| 2017/0169092 A1* | 6/2017 | Baird ............... G06F 16/2365 |
| 2017/0180284 A1 | 6/2017 | Smullen et al. |
| 2017/0213237 A1 | 7/2017 | Yadagiri et al. |
| 2017/0323330 A1* | 11/2017 | Chittilappilly ..... G06Q 30/0244 |
| 2017/0337588 A1* | 11/2017 | Chittilappilly ..... G06Q 30/0244 |
| 2018/0096417 A1 | 4/2018 | Cook et al. |
| 2018/0308123 A1 | 10/2018 | Zhong et al. |
| 2018/0336639 A1* | 11/2018 | Dziabiak ............... G06Q 40/08 |
| 2018/0336640 A1* | 11/2018 | Dziabiak ............. G06F 16/2455 |
| 2019/0130040 A1* | 5/2019 | Ma ............... G06F 16/244 |
| 2019/0278378 A1* | 9/2019 | Yan ............... G06Q 30/0242 |
| 2020/0082442 A1 | 3/2020 | Sotomayor |
| 2020/0117740 A1* | 4/2020 | Schmidt ............. G06F 16/9535 |

OTHER PUBLICATIONS

U.S. Appl. No. 16/189,784, Nov. 23, 2021, Office Action.
U.S. Appl. No. 16/166,806, Jul. 14, 2021, Notice of Allowance.
U.S. Appl. No. 16/189,812, Jul. 1, 2021, Office Action.
U.S. Appl. No. 16/189,739, Dec. 14, 2020, Notice of Allowance.
U.S. Appl. No. 16/166,806, Dec. 16, 2020, Office Action.
U.S. Appl. No. 16/189,812, Jan. 8, 2021, Office Action.
U.S. Appl. No. 16/166,806, Apr. 5, 2021, Office Action.
U.S. Appl. No. 16/189,784, May 21, 2021, Office Action.
U.S. Appl. No. 16/189,739, Aug. 6, 2020, Office Action.
U.S. Appl. No. 16/189,784, dated Mar. 15, 2022, Notice of Allowance.

* cited by examiner

Fig. 3B

DYNAMICALLY GENERATING ATTRIBUTION-MODEL VISUALIZATIONS FOR DISPLAY IN ATTRIBUTION USER INTERFACES

BACKGROUND

Attribution-modeling systems currently use attribution models to analyze data for orders, revenue, or other metrics and attribute such metrics to marketing channels. Upon making such attributions, conventional attribution-modeling systems sometimes generate reports for display in a graphical user interface with the attributions of metrics to marketing channels. But current graphical user interfaces for conventional systems have technical limitations that isolate and curtail the functionalities of attribution-modeling systems.

For example, some conventional attribution-modeling systems use an isolated user interface siloed off from (and incompatible with) other software applications. Such conventional user interfaces often require analysts or other users to utilize different user interfaces to evaluate attributions in the context of data presented by other software applications. Indeed, these user interfaces not only limit viewing the attributions, but can also limit the datasets to which an attribution model is applied by separating an interface from other applications.

In addition to isolation, in some cases, conventional attribution-modeling systems utilize user interfaces that access preconfigured and labelled datasets for orders, revenue, or other metrics to generate attribution reports. By limiting a user interface to such preconfigured datasets, the interface sometimes cannot facilitate a user in generating an attribution report without preconfigured datasets or modifying an existing attribution report. Rather than enabling modifications, conventional user interfaces often require a user to reconfigure inputs for an attribution model and execute a different query to produce an attribution report with minor (or major) modifications. This inflexible access to preconfigured datasets increases the processing load on computing devices by forcing the interface to construct queries anew for modifications to an attribution report in isolation from previously generated reports.

Independent of preconfigured datasets, conventional user interfaces for attribution-modeling systems are inflexible for other reasons. In some cases, for instance, attribution-modeling systems limit user interfaces to preset attribution models and a curated set of marketing channels. For example, some attribution-modeling systems limit user interfaces to applications for first-touch, last-touch, or other conventional attribution models. Similarly, in some cases, attribution-modeling systems limit user interfaces to applications for marketing channels to the exclusion of other properties outside of canonical attribution models.

SUMMARY

This disclosure describes one or more embodiments of methods, non-transitory computer readable media, and systems that solve the foregoing problems in addition to providing other benefits. For example, in some embodiments, the disclosed systems provide an attribution user interface that integrates an attribution model as a native component within the interface to configure analytics visualizations. By integrating attribution models and corresponding functions as native components of a user interface, the disclosed systems can implement attribution models as parameters of attribution distributions or of any attribution visualizations, where the attribution models function as event categories. By implementing attribution models as such native components, the disclosed systems can provide analytics tools to generate visualizations of different attribution distributions of events across dimension values (or other visualizations) based on different attribution models. In some implementations, the disclosed systems can also modify an attribution-distribution visualization extemporaneously given user inputs for a new event category, new dimension, new segment, or other parameter for the visualization.

For instance, in some embodiments, the disclosed systems receive user input identifying an event category comprising multiple events and a dimension comprising multiple dimension values for visualization within an attribution user interface. Based on the user input, the systems provide for display within the attribution user interface a first attribution distribution of the events across the dimension values according to an attribution model. In certain implementations, the systems further receive user input identifying one or more of a new attribution model, new event category, or new dimension. Based on one or more of the new attribution model, new event category, or new dimension, the systems subsequently provide a second attribution distribution for display within the attribution user interface.

BRIEF DESCRIPTION OF THE DRAWINGS

The detailed description refers to the drawings briefly described below.

FIGS. 3A-3H illustrate graphical user interfaces of a client device presenting visualizations for attribution distributions, modified attribution distributions, and comparisons of attribution distributions according to differing attribution models in accordance with one or more embodiments.

DETAILED DESCRIPTION

Figure 1:
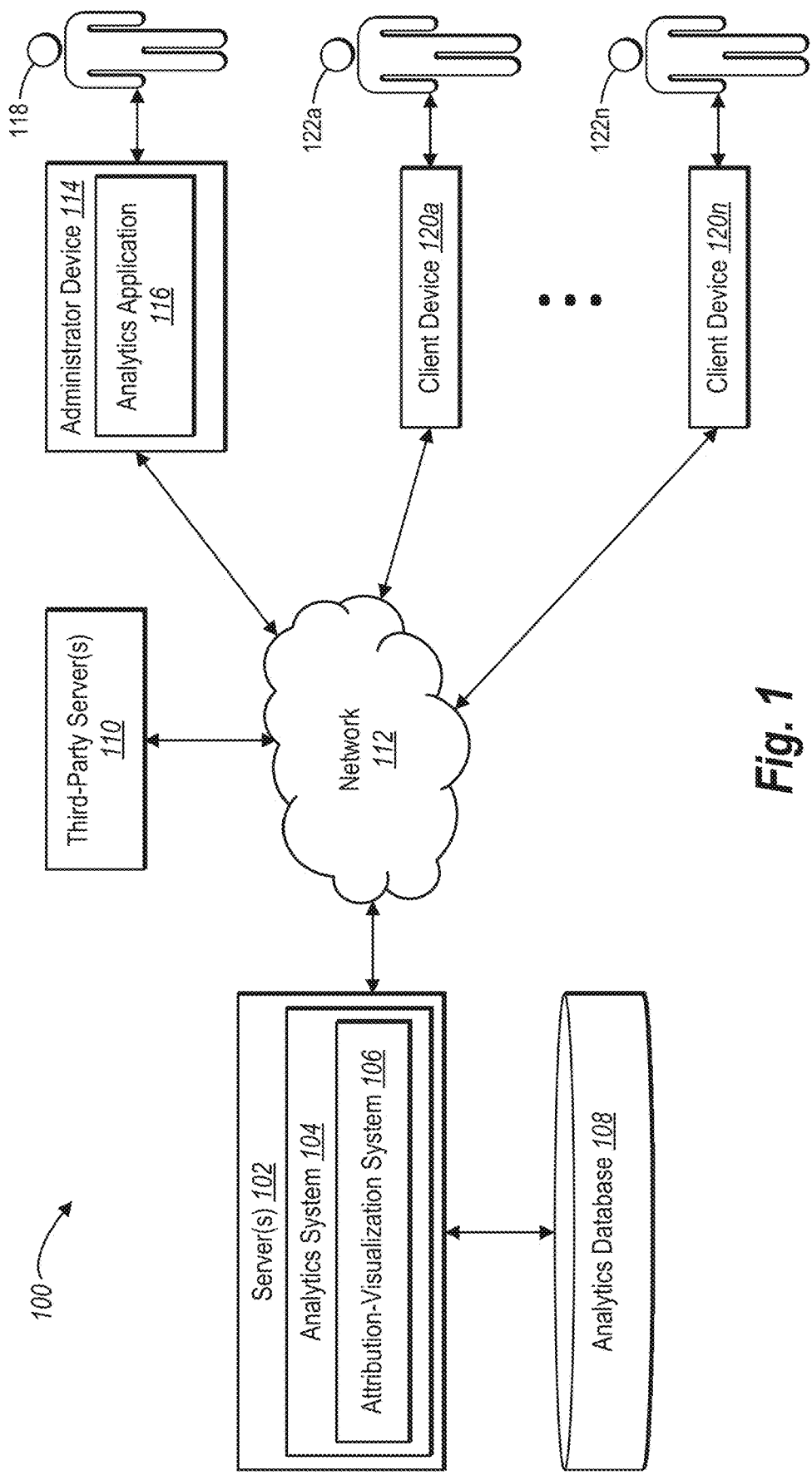
FIG. 1 illustrates a block diagram of an environment in which an attribution-visualization system can operate in accordance with one or more embodiments.

One or more embodiments described herein include an attribution-visualization system that generates an attribution user interface that incorporates attribution models to configure visualizations for attribution distributions. For example, in some cases, the attribution-visualization system provides an attribution user interface that facilitates applying an attribution model to any combination of an event category, dimension, or other parameter for various attribution distributions of events across dimension values. Further, in some implementations, the attribution-visualization system can customize an attribution-event function with one or more attribution models for dynamic comparisons of events according to customized or differing attribution models. In some cases, the attribution-visualization system can also extemporaneously modify an attribution-distribution visualization (or other attribution visualizations) given a user-indicated change (or addition) of a new event category, new dimension, or new segment of users.

As mentioned above, in some embodiments, the attribution-visualization system receives user input identifying an event category comprising multiple events and a dimension comprising multiple dimension values for visualization within an attribution user interface. Based on the user input, the attribution-visualization system provides for display within the attribution user interface a first attribution distribution of the events across the dimension values according to an attribution model. In some cases, the attribution-visualization system uses a user-selected attribution model, customized attribution model, or a default attribution model. Having generated the first attribution distribution, in certain implementations, the attribution-visualization system further receives user input identifying one or more of a new attribution model, a new event category, or a new dimension. Based on one or more of the new attribution model, new event category, or new dimension, the attribution-visualization system subsequently provides a second attribution distribution for display within the attribution user interface.

As suggested above, the first and second attribution distributions may be based on a variety of user inputs from the attribution user interface. For instance, in some cases, the attribution user interface includes selectable options (or entry fields) for different attribution models, event categories, dimensions, or, alternatively, customized configurations of such models, categories, or dimensions defining parameters for an attribution distribution. Similarly, in some embodiments, the attribution user interface includes options (or entry fields) for dimension filters, segments of users, or other inputs that define parameters for an attribution distribution.

As further mentioned above, the attribution-visualization system can present attribution distributions (e.g., the first and second attribution distributions) in a variety of visualizations. In some cases, for instance, the attribution-visualization system generates a second attribution distribution that represents a modification of the first attribution distribution. Such a modified attribution distribution can comprise a distribution of the events across the dimension values according to a new attribution model selected from the attribution user interface. Similarly, a modified attribution distribution can comprise a distribution of new events corresponding to a new event category selected from the attribution user interface. Such a modified attribution distribution includes the new events across the dimension values according to the attribution model in the first attribution distribution. Additionally, or alternatively, a modified attribution distribution can include modifications based on a dimension filter or a selected segment of users.

In addition (or in the alternative) to a modified attribution distribution, in some embodiments, the attribution-visualization system generates a second attribution distribution with the first attribution distribution for simultaneous display within the attribution user interface. For example, the attribution-visualization system can provide both the first and second attribution distributions within the attribution user interface as part of a comparison table correlating the attribution distributions. Similarly, the attribution-visualization system can provide the first and second attribution distributions within a model-dimension-comparison visualization grouping attributions of events attributed to dimension values according to different attribution models. The attribution-visualization system can additionally (or alternatively) compare attribution models within the attribution user interface as part of a channel-overlap visualization, model-comparison plot, or other attribution visualization.

Beyond comparing attribution distributions or attribution models, in some embodiments, the attribution-visualization system can extemporaneously generate different attribution distributions of events across dimension values according to different attribution models. For instance, in some cases, the attribution-visualization system receives user inputs indicating a first attribution model, a second attribution model, a dimension comprising dimension values, and an event category comprising events. Based on receiving such input, the attribution-visualization system can extemporaneously generate (i) a first attribution distribution of the events across the dimension values according to the first attribution model and (ii) a second attribution distribution of the event across the dimension values according to the second attribution model. To generate the first and second attribution distributions extemporaneously, the attribution-visualization system can access raw datasets for events and dimensions.

Independent of the type of visualization, in some embodiments, the attribution-visualization system generates customized or new attribution models to apply within a visualization using an attribution-event function. For instance, in certain implementations, the attribution-visualization system receives user input defining an attribution-event function comprising one or more attribution models and an operation. The operation may relate, for example, different attribution models and events to each other. The attribution-visualization system subsequently provides for display within the attribution user interface an attribution distribution according to the customized attribution model defined in the attribution-event function.

As suggested above, the attribution-visualization system overcomes several technical deficiencies that hinder conventional attribution-modeling systems. First, the attribution-visualization system improves the efficiency of configuring and generating attribution visualizations. For example, unlike the isolated user interfaces of conventional attribution-modeling systems, the attribution-visualization system uses an attribution user interface that integrates attribution models as native components for application to an event category, dimension, or other parameter. Having integrated attribution models into an interface with other analytical tools, the attribution-visualization system improves conventional system's reliance on multiple user interfaces—or on moving from screen to screen—and instead consolidates attribution functions into the attribution user interface to evaluate attributions with different event categories or dimensions. Accordingly, the attribution-visualization system can reduce user interactions and time relative to conventional systems.

In addition to integrated configurations, unlike conventional systems that access preconfigured datasets, the attribution-visualization system can access datasets on the fly (e.g., in real-time) corresponding to any event category, dimension, or segment of users for extemporaneous generation of an attribution visualization. The disclosed attribution-visualization system introduces a new function and interface for generating for display attribution distributions and other visualizations from raw datasets for events, dimensions, segments of users, or other parameters.

Second, the attribution-visualization system improves the flexibility with which an attribution-modeling system generates or modifies a display of an attribution distribution or attribution visualization. By integrating attribution models and corresponding functions as native components of a user interface, the disclosed attribution-visualization system uses the attribution user interface to modify impromptu an attribution distribution or attribution visualization with a new or updated event category, dimension, segment, or other parameter. The disclosed attribution user interface accordingly improves the conventional practice of reconfiguring inputs for an attribution model in an interface to modify an attribution distribution by enabling a flexible reconfiguration of model, category, or dimension directly within the attribution user interface.

Third, the attribution-visualization system introduces functionality that conventional attribution-modeling systems previously could not perform. For instance, in some embodiments, the attribution-visualization system can customize an attribution-event function comprising one or more attribution models and an operation for dynamic comparisons of events according to customized (or differing) attribution models. Such an attribution-event function can include more complex and specific attributions than some of the conventional attribution models available to attribution-modeling systems. Additionally, or alternatively, in some embodiments, the attribution-visualization system generates attribution visualizations within the attribution user interface that previous systems could not generate. As described below, the attribution-visualization system introduces one or more of attribution distributions, model-dimension-comparison visualizations for grouping attributions, Venn diagrams, or scatter plots that conventional user interfaces cannot facilitate.

As indicated by the foregoing description, this disclosure uses a variety of terms to describe features and advantages of the attribution-visualization system. As used in this disclosure, the term "attribution" refers to a measure of causation, credit, contribution, responsibility, or influence (in whole or in part) between a factor or variable and a result. In particular, attribution can include an assignment of credit or influence to a dimension value for an event. For instance, attribution can refer to determining that digital content distributed through email are responsible for a particular percentage of overall purchases of a given product (i.e., the dimension value of email is wholly or partially responsible for particular purchase events).

Similarly, the term "attribution model" refers to a computer-based algorithm or rule set that determines an attribution or attribution distribution. In particular, an attribution model includes a computer-implemented algorithm that determines a measure of causation, credit, contribution, influence, or responsibility between a factor (e.g., a dimension value) and a result (e.g., an event), where multiple factors may contribute to the result. In some embodiments, an attribution model employs machine learning or statistical models to determine weights (e.g., using a regression analysis). In other embodiments, an attribution model is rule-based by using predetermined weights based on rules. The attribution-visualization system can train an attribution model based on observations that incorporate a discrete-time survival model, which is a type of time-to-event model. Additionally, the attribution-visualization system can create a supervised learning model (e.g., via machine learning).

Attribution models include, for example, a first-touch model, a last-touch model, a linear model, a participation model, a same-touch model, a U-shaped model, J-curve model, an inverse-J model, a time-decay model, and a custom-attribution model. A first-touch model assigns all credit of success to a first channel (or other dimension value) with which a user engages. A last-touch model assigns all credit to the last channel (or other dimension value) with which a user engages. A linear model applies equal weight to all dimension values (e.g., distribution channels). A participation model assigns equal credit to every unique dimension value. A same-touch model assigns all credit to the dimension value where a result (e.g., conversion) occurs. A U-shaped model assigns particular percentages of credit to dimension values of two key touchpoints—the first touch and the lead creation—as well as to those values of any touchpoints in between the two. A J-curve model assigns particular percentages of credit to the values of the first and last touchpoints (e.g., 20% to the first and 60% to the last) and spreads the remaining percentage across any dimension values of additional touchpoints. An inverse-J model is the inverse of the J-curve model where, for example, 60% of the credit is assigned to the dimension value of the first touchpoint and 20% is assigned to the last. A time-decay model assigns credit according to the length of time between touchpoints or between a touchpoint and a result (e.g., a conversion), where dimension values of more recent touchpoints are weighted heavier than those of older touchpoints, which may not have been as impactful on a given result. A custom-attribution model attributes credit according to user-defined parameters or settings. Indeed, the attribution-visualization system can receive user input within the attribution user interface to define a custom attribution model.

Relatedly, an "event" refers to a quantifiable action performed by a user or a quantifiable result of an action by a user. In some cases, an event includes a discrete quantifiable action (or result of an action) taken by a visitor on a network platform, such as in a software application or a on website. For example, an event can include, but is not limited to, an application download, an application use, a click, a click-through, a conversion, an order, a purchase, a webpage view, a web search, an instance of a quantity of time spent on a given webpage, a first time visit, a visitor from a search engine or a social networking site, a transaction resulting in a quantity of revenue, or a quantity of revenue over a certain amount.

As noted above, the attribution-visualization system can categorize events into event categories. As used in this disclosure, an "event category" refers to a collective class or type of quantifiable actions (or quantifiable result of actions) by users. In particular, in some embodiments, an event category includes a type of quantifiable actions (or result of actions) taken by a visitor on a network platform. Event categories include, but are not limited to, application downloads, application uses, clicks, click-throughs, conversions, orders, purchases, revenue, searches, time spent on a given webpage, views, visits, or first time visits. In some embodiments, each time a user interacts with a particular entity (e.g., dimension value such as a distribution channel), the attribution-visualization system stores the event within an analytics database.

As noted above, the attribution-visualization system can identify, track, quantify, and store events relative to particular dimensions and dimension values. As used in this disclosure, a "dimension" refers to a set, category, or classification of values for organizing or attributing underlying data (e.g., a set of values for analyzing, grouping, or comparing event data). In some embodiments, a dimension refers to non-numeric characteristics (e.g., characteristics of one or more digital content campaigns) that correlate, relate, or classify events. Dimensions include, but are not limited to, distribution channels, products, product names, webpages, campaigns, ages, custom eVars, dates, monitor resolutions, genders, geographic locations, pages, or page names. Relatedly, a "dimension value" refers to a particular item, value, or component in a dimension. For example, a dimension value can be a particular distribution channel, product, product name, webpage, campaign, age, custom eVar, date, monitor resolution, gender, geographic location, monitor resolution, product, product name, page, or page name.

As a particular example of a dimension, a "distribution channel" can refer to a medium, channel, outlet, or method by which a user can access or receive information. For example, a distribution channel can include a medium by which a user purchases a product or observes a video related to a service. Distribution channels include, but are not limited to, email, referring domains, display, social media, organic search, and paid search.

As noted above, in some embodiments, the attribution-visualization system generates attribution distributions to assign credit for events across dimension values of a dimension. As used in this disclosure, an "attribution distribution" refers to a distribution or allocation of events across values of a dimension in accordance with an attribution model. For example, an attribution distribution can include an indication that 40% of purchases of a particular product is attributed to email distributions while 50% is attributed to paid searches and 10% is attributed to social networking.

Finally, the term "visualization" refers to a graphical representation of a dataset generated by a computing device. In particular, in some embodiments, a visualization refers to a graphical representation of an attribution of one or more events to one or more dimension values shown within an attribution user interface. For example, a visualization may include, but is not limited to, a graphical representation of an attribution distribution in a table, histogram, model comparison, channel overlap (e.g., Venn diagram), or model-comparison-scatter plot.

Turning now to FIG. 1, this figure depicts a block diagram illustrating an exemplary system environment ("environment") 100 in which an attribution-visualization system 106 can operate in accordance with one or more embodiments. Specifically, FIG. 1 illustrates the environment 100 comprising server(s) 102, third-party server(s) 110, a network 112, an administrator device 114, an administrator 118 associated with the administrator device 114, client devices 120a-120n, and users 122a-122n associated with the client devices 120a-122n. Although FIG. 1 illustrates one administrator device and one administrator—and two client devices and two users—the environment 100 can alternatively include any number of computing devices and associated administrators or users. Similarly, although FIG. 1 illustrates a particular arrangement of the server(s) 102, the third-party server(s) 110, the network 112, the administrator device 114, and the client devices 120a-120n, various additional arrangements are possible.

As shown in FIG. 1, the server(s) 102, the third-party server(s) 110, the network 112, the administrator device 114, and the client devices 120a-120n may be communicatively coupled with each other either directly or indirectly, such as coupling through the network 112, which is described further below in relation to FIG. 9. The server(s) 102, the administrator device 114, and the client devices 120a-120n may include any type of computing device, including one or more computing devices as discussed further below in relation to FIG. 9.

As depicted in FIG. 1, the server(s) 102 can generate, store, receive, and/or transmit any type of data, including user inputs identifying attribution models or other parameters for an attribution distribution or datasets underlying attribution visualizations. For example, the server(s) 102 can receive user input identifying an attribution model, a dimension, or an event category from the administrator device 114 and transmit data packets that, upon receipt, cause the administrator device 114 to present an attribution user interface. In some embodiments, the server(s) 102 comprise a data server, a communication server, or a web-hosting server.

As further shown in FIG. 1, the server(s) 102 can include an analytics system 104. The analytics system 104 can perform various digital-analytics functions or digital-campaign functions. For example, in some embodiments, the analytics system 104 uses the server(s) 102 to collect data corresponding to events and touchpoints from the client devices 120a-120n (e.g., by collecting data tracking application uses, orders, purchases, or webpage views related to digital content campaigns). The analytics system 104 may collect such datasets to determine relationships of user activity to one or both of events and dimension values. Relatedly, in some cases, the third-party server(s) or the analytics system 104 via the server(s) design digital content campaigns and provide digital content for the digital content campaigns to the client devices 120a-120n.

Additionally, the analytics system 104 can use the server(s) 102 to request from the third-party server(s) 118 (or retrieve from an analytics database 108) datasets corresponding to an attribution model, a dimension, and/or events. The analytics system 104 can further use the server(s) 102 to determine an attribution distribution of events from the event category across dimension values from the dimension according to the attribution model. For instance, in some embodiments, the analytics system 104 analyzes datasets from the analytics database 108 corresponding to actions/touchpoints, events, and dimension values in response to user input from the administrator device 114. Based on an identification of one or more of an attribution model, an event category, and/or a dimension from the administrator device 114, the analytics system 104 further applies the attribution model to such datasets to generate an attribution distribution.

When generating an attribution distribution, in some cases, the analytics system 104 accesses datasets from the analytics database 108 in real time (or near real time) without requiring pre-configuration or any form of advanced notice. For example, the analytics system 104 can receive a request to generate an attribution distribution of events across particular dimension values and can query the analytics database 108 for data to generate the attribution distribution on the fly. In certain implementations, the analytics system 104 uses the server(s) 102 to further transmit a dataset representing the attribution distribution to the administrator device 114.

In addition to the analytics system 104, the server(s) 102 can include the attribution-visualization system 106. In particular, in some embodiments, the attribution-visualization system 106 uses the server(s) 102 to receive user input identifying an event category comprising multiple events and a dimension comprising multiple dimension values for visualization within an attribution user interface. Based on the user input, the attribution-visualization system 106 uses the server(s) 102 to provide for display within the attribution user interface a first attribution distribution of the events across the dimension values according to an attribution model. In certain implementations, the attribution-visualization system 106 further uses the server(s) 102 to receive user input identifying one or more of a new attribution model, a new event category, or a new dimension. Based on one or more of the new model, category, or dimension, the attribution-visualization system 106 subsequently uses the server(s) 102 to provide a second attribution distribution for display within the attribution user interface.

As illustrated by the previous embodiments, the attribution-visualization system 106 can be implemented in whole or in part by the individual elements of the environment 100. Although FIG. 1 illustrates the attribution-visualization system 106 implemented within the server(s) 102, components of the attribution-visualization system 106 can be implemented in any of the components of the environment 100. For instance, in some embodiments, the administrator device 114 comprises the attribution-visualization system 106 and performs all of the functions, methods, and processes of the attribution-visualization system 106 described above and below. This disclosure describes the components of the attribution-visualization system 106 further below with regard to FIG. 6.

As further shown in FIG. 1, in some embodiments, the administrator device 114 comprises a computing device that allows the administrator 118 to send and receive digital communications. For example, the administrator device 114 can include a desktop computer, laptop computer, smartphone, tablet, or other electronic device. In some embodiments, the administrator device 114 further includes one or more software applications (e.g., an analytics application 116) that allows the administrator 118 to send and receive digital communications. For example, the analytics application 116 can be a software application installed on the administrator device 114 or a software application hosted on the server(s) 102. When hosted on the server(s) 102, the analytics application 116 may be accessed by the administrator device 114 through another application, such as a web browser. In some implementations, the analytics application 116 includes instructions that, when executed by a processor, cause the administrator device 114 to present one or more graphical user interfaces, such as various attribution user interfaces described below.

As also illustrated in FIG. 1, the analytics system 104 is communicatively coupled to the analytics database 108. In one or more embodiments, the analytics system 104 accesses and queries data from the analytics database 108 associated with requests from the attribution-visualization system 106. For instance, the analytics system 104 may access datasets corresponding to events (e.g., orders, revenue) or dimensions (e.g., distribution channels, products) for the attribution-visualization system 106. As shown in FIG. 1, the analytics database 108 is separately maintained from the server(s) 102. Alternatively, in one or more embodiments, the analytics system 104 and the analytics database 108 comprise a single combined system or subsystem within the server(s) 102.

Figure 2:
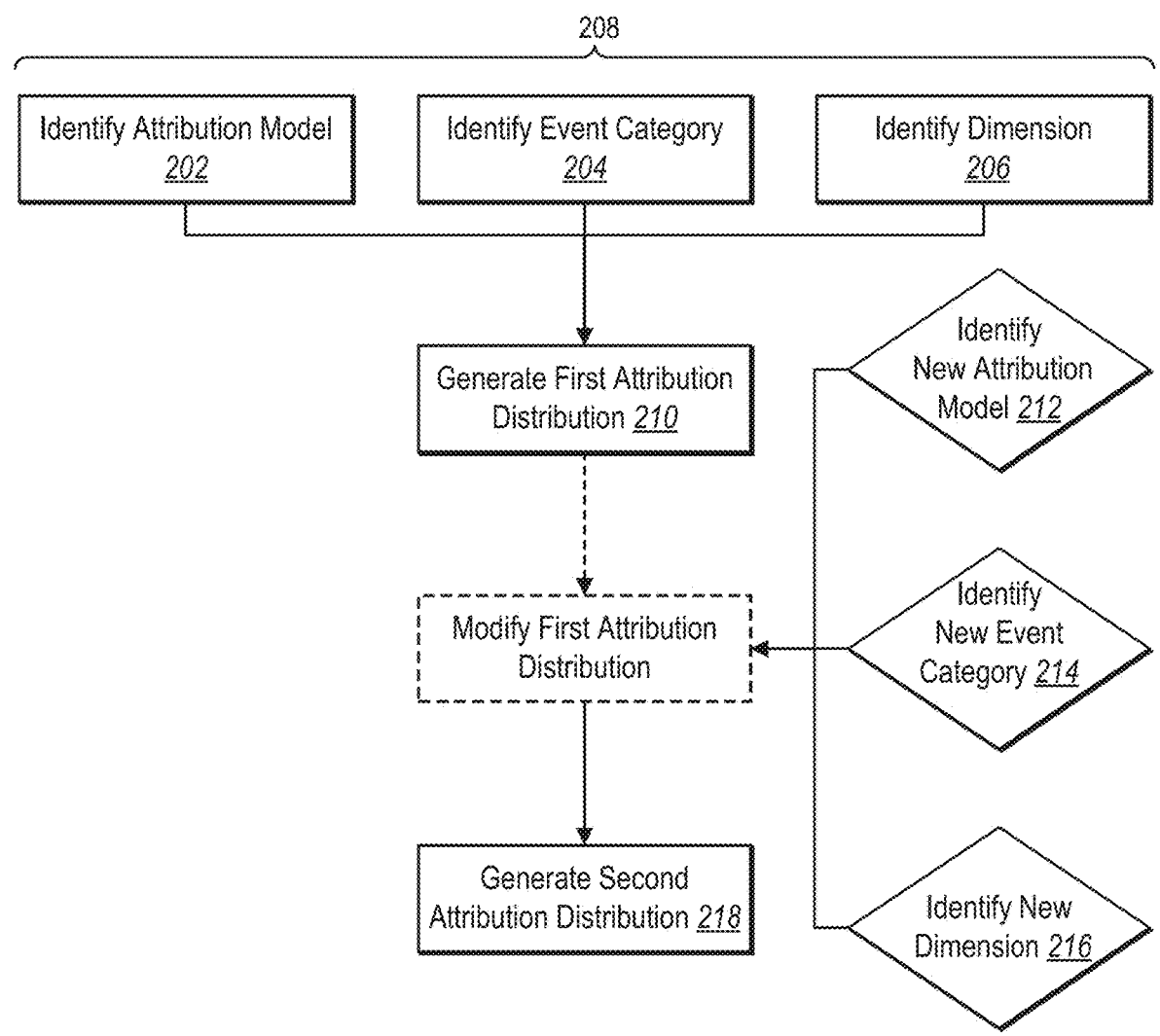
FIG. 2 illustrates a sequence-flow diagram of generating a first attribution distribution and a second attribution distribution based on different combinations of attribution models, event categories, and dimensions in accordance with one or more embodiments.

FIG. 2 illustrates a sequence-flow diagram of the attribution-visualization system 106 generating a first attribution distribution 210 and a second attribution distribution 218 based on different combinations of attribution models, event categories, and dimensions. As an overview, the attribution-visualization system 106 identifies an attribution model 202, an event category 204, and a dimension 206. Based on the identified parameters, the attribution-visualization system 106 generates for display within an attribution user interface the first attribution distribution 210. The attribution-visualization system 106 further identifies one or more of a new attribution model 212, a new event category 214, or a new dimension 212. Based on one or more of the new attribution model 212, the new event category 214, or the new dimension 216, the attribution-visualization system 106 generates the second attribution distribution 218 for display within the attribution user interface.

As just noted, in some embodiments, the attribution-visualization system 106 identifies the attribution model 202, the event category 204, and the dimension 206. For instance, in some cases, the attribution-visualization system 106 identifies such parameters by receiving user input identifying the attribution model 202, the event category 204, and the dimension 206. In particular, in certain implementations, the attribution-visualization system 106 can receive an indication of a user-selected option (or a user command or entry) corresponding to each of the attribution model 202, the event category 204, and the dimension 206. By contrast, in some embodiments, the attribution-visualization system 106 uses a default attribution model as the attribution model 202 to generate one or more attribution distributions.

As further indicated in FIG. 2, in certain embodiments, the attribution-visualization system 106 generates for display within an attribution user interface the first attribution distribution 210. In particular, the attribution-visualization system 106 generates a visualization of the first attribution distribution 210 of events from the event category 204 across dimension values from the dimension 206 according to the attribution model 202. For example, in some embodiments, the first attribution distribution 210 comprises a distribution of orders across distribution channels according to a last-touch model or other attribution model—such as a distribution of orders across email, referring domains, display, and social media. For simplicity, this disclosure sometimes refers to the attribution model 202, the event category 204, and the dimension 206 collectively as initial parameters 208 below.

After (or together with) identifying the initial parameters 208, the attribution-visualization system 106 further identifies one or more of the new attribution model 212, the new event category 214, or the new dimension 216. For example, in some cases, after generating the first attribution distribution 210 for display, the attribution-visualization system 106 can receive user input identifying one or more of the new attribution model 212, the new event category 214, or the new dimension 216. In some such implementations, the attribution-visualization system 106 uses the new attribution model 212, the new event category 214, or the new dimension 216 as parameter(s) for modifying the first attribution distribution 210 or generating a new attribution distribution in addition to the first attribution distribution 210.

In addition (or in the alternative) to identifying new parameters after generating the first attribution distribution 210, in some embodiments, the attribution-visualization system 106 receives user input identifying one or more of the new attribution model 212, the new event category 214, or the new dimension 216—at, near, or during the same time as identifying the initial parameters 208. In some such embodiments, the attribution-visualization system 106 uses one or more of the new attribution model 212, the new event category 214, or the new dimension 216 as parameters for extemporaneously generating a new attribution distribution in addition to the first attribution distribution 210.

As further shown in FIG. 2, the attribution-visualization system 106 generates the second attribution distribution 218 for display within the attribution user interface. As indicated by FIG. 2, in some cases, the attribution-visualization system 106 modifies the first attribution distribution 210 based on one or more of the new attribution model 212, the new event category 214, or the new dimension 216. Alternatively, the attribution-visualization system 106 can generate a new attribution distribution for display within the attribution user interface together with the first attribution distribution 210.

To generate an attribution distribution, such as the first attribution distribution 210 or the second attribution distribution 218, the attribution-visualization system 106 analyzes datasets from a database corresponding to actions/touchpoints, events, and dimension values. The attribution-visualization system 106 further applies an attribution model to the datasets stored within the database. For example, the attribution-visualization system 106 stores datasets including user actions/touchpoints, events, and dimension values corresponding to the actions/touchpoints. The attribution-visualization system 106 then applies an attribution model corresponding to a selected attribution element to identify which user actions/touchpoints correspond to events within a particular event category.

By applying the attribution model to these datasets, the attribution-visualization system 106 determines which actions/touchpoints led to events within event categories and which dimension values corresponding to the actions/touchpoints to credit for the events in an attribution distribution. For example, based on datasets stored within the database, the attribution-visualization system 106 can determine that a click (i.e., an example of a user action or touchpoint) within an email (i.e., an example of a dimension value) led to an order (i.e., an example of an event) in accordance with a first-touch attribution (i.e. an example of an attribution model). The attribution-visualization system 106 can likewise access the datasets stored within the database in a similar manner to modify attribution distributions in response to receiving a user input identifying the new attribution model 212, the new event category 214, or the new dimension 216.

In some cases, for instance, the attribution-visualization system 106 generates the second attribution distribution 218 comprising a distribution of the events from the event category 204 across dimension values from the dimension 206 according to the new attribution model 212 selected from the attribution user interface. By contrast, in some cases, the attribution-visualization system 106 generates the second attribution distribution 218 comprising new events from the new event category 214 selected from the attribution user interface. In some such cases, the distribution comprises the new events across the dimension values from the dimension 206 according to the attribution model 202. Further, in one or more implementations, the attribution-visualization system 106 generates the second attribution distribution 218 comprising new dimension values from the new dimension 216 selected from the attribution user interface. Accordingly, the second attribution distribution 218 can comprise a distribution of the events from the event category 204 across new dimension values from the new dimension 216 according to the attribution model 202.

The foregoing examples of the second attribution distribution 210 are merely exemplary. Indeed, the second attribution distribution 210 may include any combination of the new attribution model 212, the new event category 214, or the new dimension 216. Further examples of such combinations are described below in the context of graphical user interfaces.

As noted above, in certain embodiments, the attribution-visualization system 106 provides one or more attribution distributions for display within an attribution user interface. FIGS. 3A-3H illustrate the administrator device 114 presenting graphical user interfaces comprising visualizations for attribution distributions, modified attribution distributions, and comparisons of attribution distributions according to differing attribution models. Indeed, the attribution-visualization system 106 integrates one or more attribution models as native components of various graphical user interfaces shown in FIGS. 3A-3H (e.g., where the attribution models function as event categories). As described below, FIGS. 3A-3H depict graphical user interfaces from the perspective of the administrator device 114 implementing computer-executable instructions of the analytics application 116 to perform certain actions for the attribution-visualization system 106.

Figure 3A:
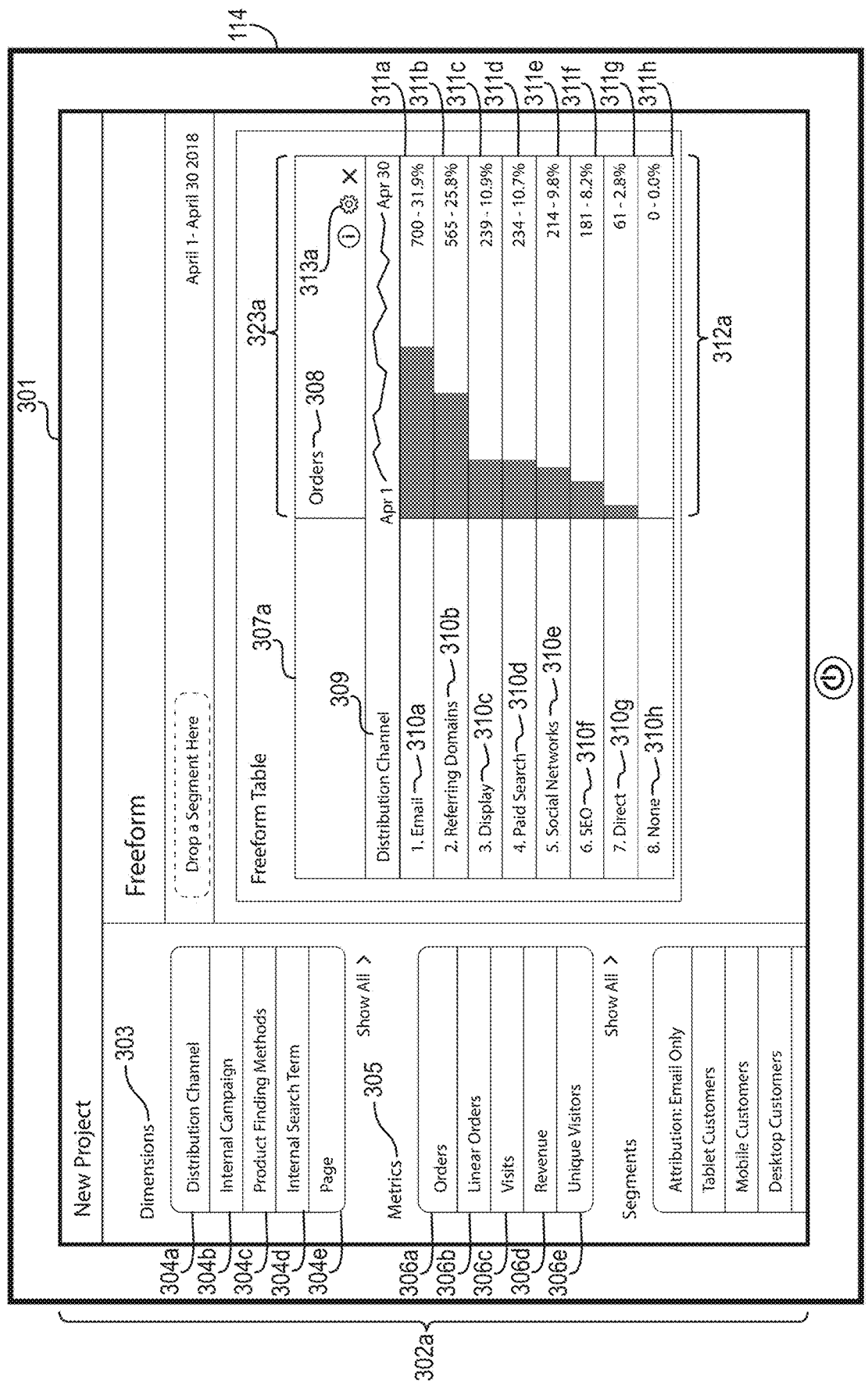

As shown in FIG. 3A, for instance, the administrator device 114 presents an attribution user interface 302a of the analytics application 116 within a screen 301. The attribution user interface 302a includes an attribution distribution 312a of events across the dimension values 310a-310h according to an attribution model. In this particular embodiment, the attribution-visualization system 106 represents the events as event-quantity indicators 311a-311h within the attribution distribution 312a. Each of the event-quantity indicators 311a-311h indicate a quantity of events attributed to a particular dimension value from dimension values 310a-310h. As suggested above, the attribution-visualization system 106 provides the attribution distribution 312a to the administrator device 114 for display within the attribution user interface 302a based on user inputs via the attribution user interface 302a.

As indicated by FIG. 3A, the attribution user interface 302a includes a dimension menu 303 comprising dimension options 304a-304e and an event-category menu 305 comprising event-category options 306a-306e. In some embodiments, each of the dimension options 304a-304e (and each of the event-category options 306a-306e) represent a selectable option that the administrator 118 can drag-and-drop into a table 307a, select for inclusion as a parameter within the table 307a, or search for within a search field (described below) for inclusion as a parameter within the table 307a. As just suggested, the attribution-visualization system 106 uses inputs within the table 307a as parameters for an attribution distribution.

Upon detecting a selection of one of the dimension options 304a-304e (or one of the event-category options 306a-306e), the administrator device 114 sends an indication of the selection to the attribution-visualization system 106 to include a corresponding dimension (or a corresponding event category) as a parameter for an attribution distribution. As shown in FIG. 3A, for instance, the attribution-visualization system 106 receives an indication from the administrator device 114 of a selection of the dimension option 304a and a selection of the event-category option 306a. While the dimension option 304a corresponds to a distribution channel and the event-category option 306a corresponds to orders in FIG. 3A, the attribution-visualization system 106 can use any of the dimensions or event categories described in this disclosure, including those dimensions and event categories respectively corresponding to the dimension options 304a-304e and the event-category options 306a-306e.

Based on receiving indications of user selections of the dimension option 304a and the event-category option 306a, the attribution-visualization system 106 generates and provides the attribution distribution 312a for display as a visualization within the attribution user interface 302a. As shown in FIG. 3A, the attribution-visualization system 106 provides the attribution distribution 312a for display as a bar-graph visualization within a column 323a of the table 307a. Based on the user selections, the attribution-visualization system 106 generates the table 307a to include the dimension values 310a-310h corresponding to a selected dimension 309 and the attribution distribution 312a to include the event-quantity indicators 311a-311h corresponding to a selected event category 308. As indicated above, the bar-graph visualization is merely an example visualization. Alternatively, the attribution-visualization system 106 can provide the attribution distribution 312a for display as any suitable visualization, including, but not limited to, a histogram or pie chart.

As further shown in FIG. 3A, the attribution distribution 312a comprises a distribution of the event-quantity indicators 311a-311h across the dimension values 310a-310h according to an attribution model. While the attribution model may be user selected, the attribution-visualization system 106 uses a default attribution model for the attribution distribution 312a in FIG. 3A. In this embodiment, each of the event-quantity indicators 311a-311h comprise one or more of a graphical-bar indicator, an event quantity (e.g., number of orders), and an event percentage (e.g., a percentage of orders). As indicated by the event-quantity indicator 311a in the attribution distribution 312a, the attribution-visualization system 106 attributes a set of event portions to the dimension value 310a. As indicated by the event-quantity indicators 311b-311h, the attribution-visualization system 106 attributes different sets of event portions to the dimension values 310b-310h, respectively.

To generate the attribution distribution 312a, for each of the dimension values 310a-310h, the attribution-visualization system 104 accesses a database to determine touchpoints (e.g., user actions) corresponding to each dimension value (e.g., emails opened by individual users) and individual user events (e.g., emails opened by individual users that ultimately placed on order). The attribution-visualization system 104 then applies an attribution model. In particular, the attribution-visualization system 104 determines touchpoints that correspond to events pursuant to the rules or algorithms corresponding to an attribution model (e.g., the first email opened by a user gets attribution credit under a first-touch attribution model). In this manner, events from the selected event category 308 are attributed (e.g., credit or allocated) to a dimension value from the dimension values 310a-310h. Based on such determinations, the attribution-visualization system 104 determines to attribute a first subset of events to the dimension value 310a, a second subset of events to the dimension value 310b, and so on and so forth. As indicated by FIG. 3A, for example, the attribution-visualization system 104 determines that 700 orders are attributed to the dimension value 310a (e.g., email), 565 orders are attributed the dimension value 310b (e.g., referring domains), 239 orders are attributed the dimension value 310c (e.g., display), and so on and so forth.

In some embodiments, depending on the attribution model applied to the attribute events across dimension values, the attribution-visualization system 104 attributes certain percentages of a single event across multiple dimension values. To illustrate, in the case of applying a J-curve model to an orders event category, the attribution-visualization system 104 can attribute, for each of the total number of orders, a first percentage of an order to the dimension value 310a (e.g., email), a second percentage of an order to the dimension value 310b (e.g., referring domains), a third percentage of an order to the dimension value 310c (e.g., display), and so on and so forth. In some case, the attribution-visualization system 104 attributes a certain percentage of an event to different dimension values (e.g., 10% of an event to the dimension value 310a for a first touch and 10% of an event to the dimension value 310b for a last touch). As indicated by FIG. 3A, in some embodiments, the attribution-visualization system 104 provides a representation of such subset of events as a graphical bar, a number, and/or a percentage in the event-quantity indicators 311a-311h.

Figure 3B:
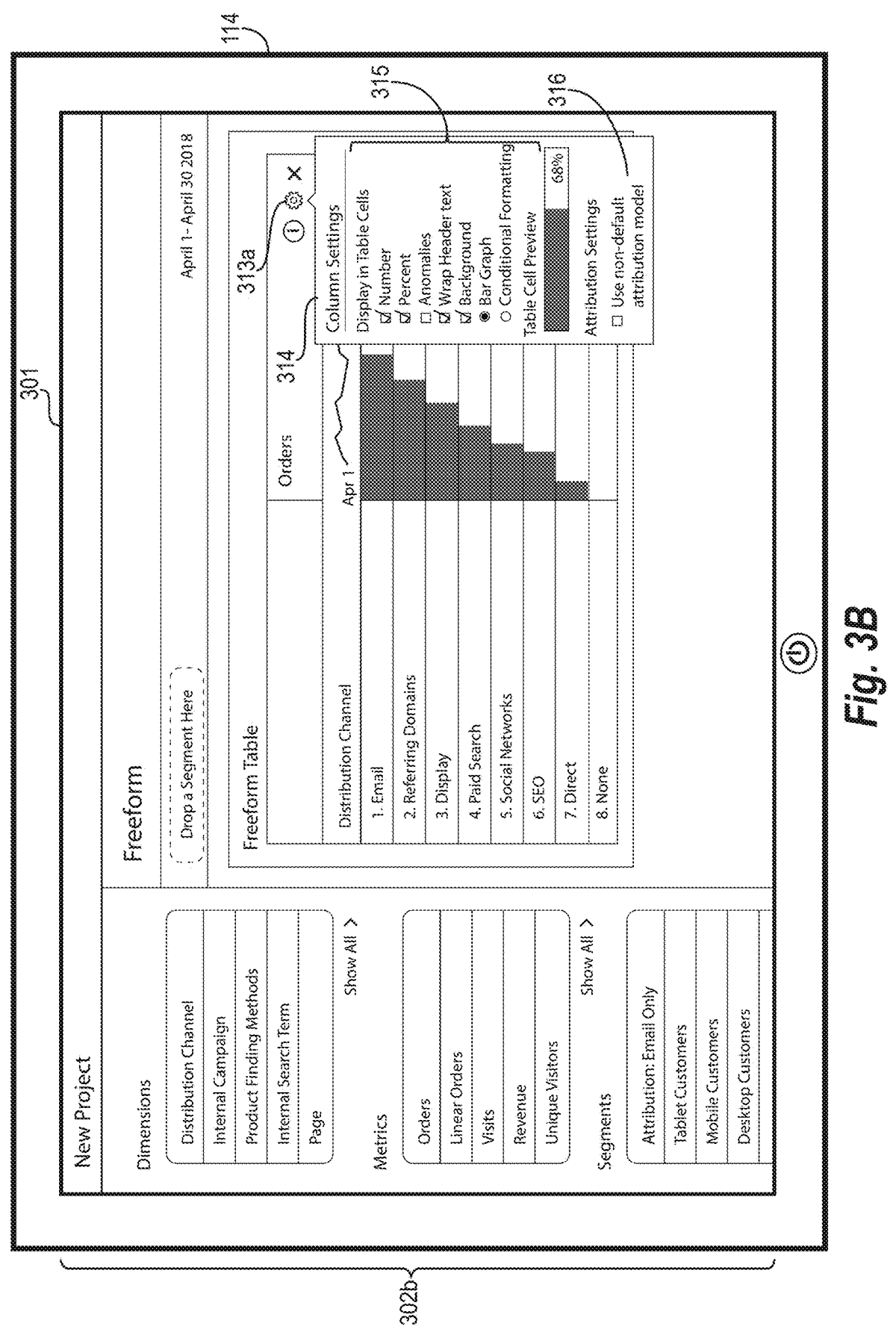

In addition to the attribution distribution 312a, the attribution user interface 302a further includes a settings option 313a. FIG. 3B illustrates the attribution-visualization system 106 updating the attribution user interface 302a to include a visualization-settings element 314 based on receiving an indication from the administrator device 114 of a selection of the settings option 313a. Upon receiving an indication of such a selection, the attribution-visualization system 106 provides the visualization-settings element 314 for display within an attribution user interface 302b of the analytics application 116.

As shown in the visualization-settings element 314 in FIG. 3B, the attribution-visualization system 106 provides table-formatting settings 315 for adjusting elements of the table 307a and the attribution distribution 312a. For example, the table-formatting settings 315 include selectable options to adjust one or both of the display of numbers and percentages for the event-quantity indicators 311a-311h. The table-formatting settings 315 likewise include selectable options to alter (or include) a visualization for the attribution distribution 312a. As shown here, the table-formatting settings 315 include an option to include or exclude a bar-graph visualization.

As further shown in the visualization-settings element 314, the attribution-visualization system 106 provides an attribution-model-modification option 316. In some embodiments, an attribution-model-modification option enables the attribution-visualization system 106 to change an attribution model for a particular attribution distribution. When, as in FIG. 3B, an attribution distribution relies on a default attribution model, the attribution-model-modification option 316 provides an option to change the default attribution model to another attribution model selected by the administrator 118.

Figure 3C:
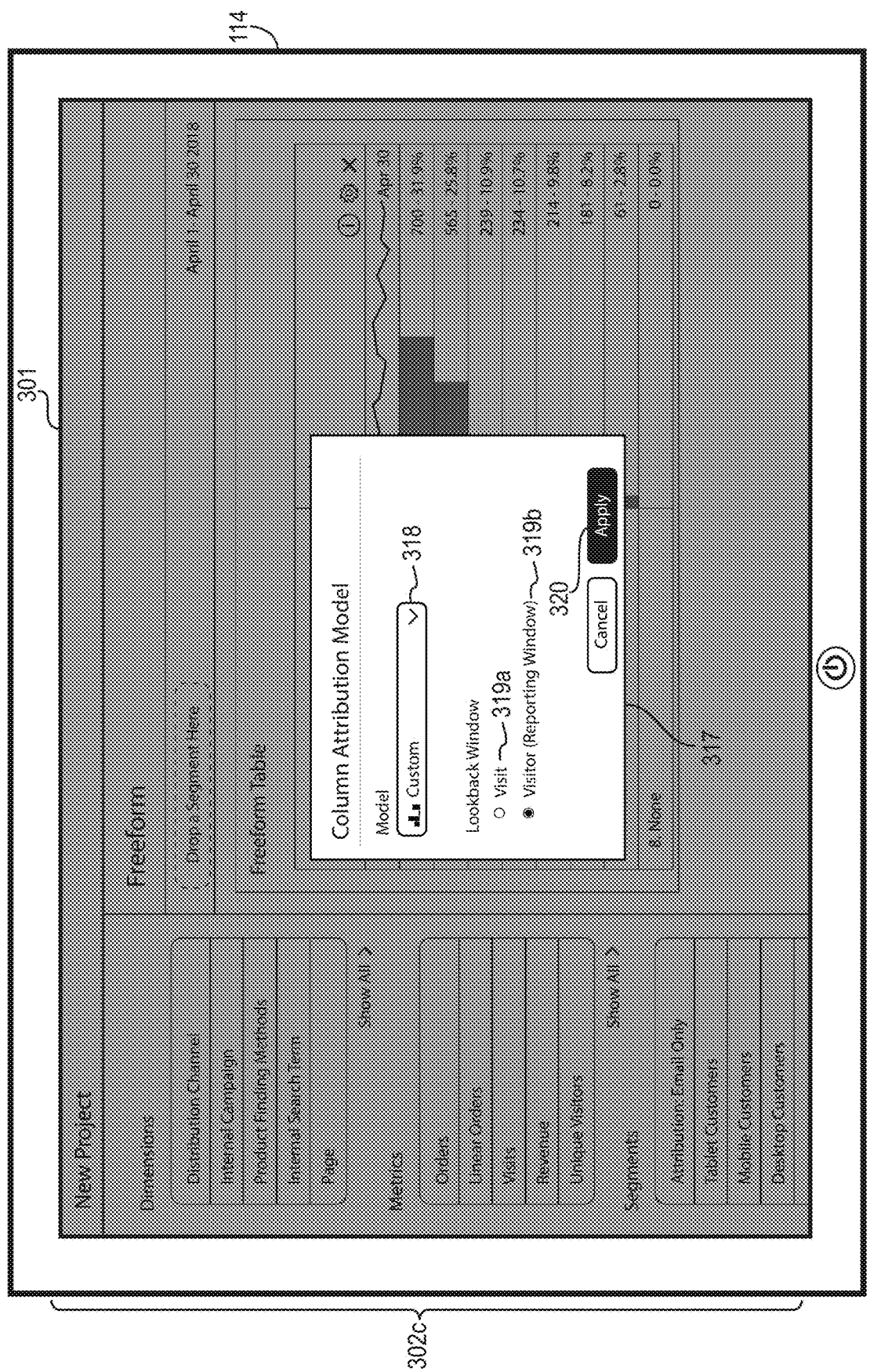

FIG. 3C illustrates the attribution-visualization system 106 updating the attribution user interface 302b to include an attribution-settings element 317 based on receiving an indication from the administrator device 114 of a selection of the attribution-model-modification option 316. Upon receiving an indication of such a selection, the attribution-visualization system 106 provides the attribution-settings element 317 for display within an attribution user interface 302c of the analytics application 116.

As shown in the attribution-settings element 317 in FIG. 3C, the attribution-visualization system 106 provides attribution-model options 318 corresponding to different attribution models. For example, in some embodiments, the attribution-model options 318 comprises a drop-down menu of various attribution models. In certain implementations, such a drop-down menu includes an option for one or more of a first-touch model, a last-touch model, a linear model, a participation model, a same-touch model, a U-shaped model, J-curve model, an inverse-J model, a time-decay model, or a custom-attribution model. Alternatively, in some embodiments, the attribution-visualization system 106 provides a selectable option for each different attribution model. As indicated in FIG. 3C, the administrator device 114 detects a selection by the administrator 118 of the custom-attribution model.

In some embodiments, upon selection of the option for the custom-attribution model, the attribution-visualization system 106 can further provide weighting options to designate a weight or percentage of credit for a conversion to each of an initial touch, intermediary touches, and a last touch. In one such custom-attribution model, for instance, the attribution-visualization system 106 may receive a designation of 10% for the initial touch, 80% for intermediary touches, and 10% for the last touch as part of the custom-attribution model. Such a custom-attribution model is merely an example. The attribution-visualization system 106 can use any weight or designated percentage for a custom-attribution model or provide options to adjust an existing attribution model.

As further shown in the attribution-settings element 317, the attribution-visualization system 106 provides lookback-window options 319*a* and 319*b*. The lookback-window options 319*a* and 319*b* correspond to different lookback windows for grouping events or hits to which an attribution model applies. According to the lookback-window option 319*a*, the attribution-visualization system 106 considers any sequence of activity separated by a set amount of time for a visit when applying an attribution model. According to the lookback-window option 319*b*, the attribution-visualization system 106 considers a totality of a visitor's hits or events within a particular reporting window (and an additional default time) when applying an attribution model. For the lookback-window option 319*b*, an example reporting window comprises a date range of "Apr. 1-Apr. 30, 2018" as indicated in the attribution user interface 302*c* and any remaining dates in a month indicated by the date range (which would be none for the month of April).

As further shown in FIG. 3C, the attribution user interface 302*c* includes an apply-model option 320. Upon receiving an indication of a selection of the apply-model option 320, the analytics system 104 (or the attribution-visualization system 106) applies a selected attribution model and a selected lookback window to datasets corresponding to the selected event category 308 and the selected dimension 309. By applying the selected attribution model to previously selected event categories and dimensions, the analytics system 104 (or the attribution-visualization system 106) can generate a new attribution distribution.

Figure 3D:
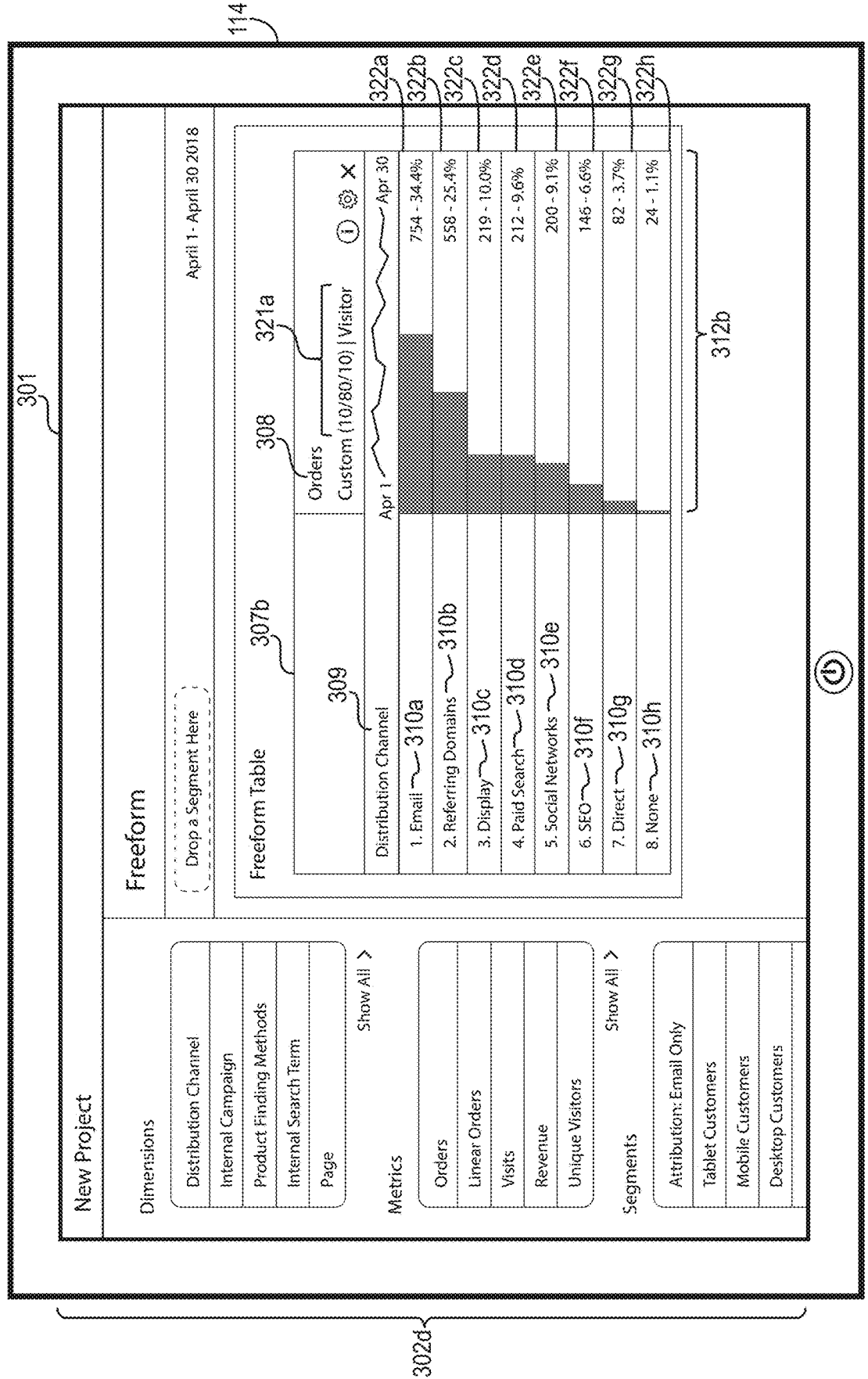

As shown in FIG. 3D, the attribution-visualization system 106 generates an attribution distribution 312*b* for display as a visualization within an attribution user interface 302*d* based on receiving indications of a new attribution model and a lookback window. As suggested above, the attribution-visualization system 106 generates the attribution distribution 312*b* as a modified version of the attribution distribution 312*a* based on an attribution model and a lookback window selected by the administrator 118 in the attribution-settings element 317. Here, an attribution-model indicator 321*a* indicates the new attribution model selected (and applied to) the selected event category 308 and the selected dimension 309. For explanatory purposes, the attribution-model indicator 321*a* indicates the custom-attribution model described above comprising designations of 10% for initial touch, 80% for intermediary touches, and 10% for last touch as well as a visitor lookback window.

As further indicated by FIG. 3D, the attribution-visualization system 106 provides the attribution distribution 312*b* for display within a table 307*b* as bar-graph visualization. Consistent with the user selections, the attribution-visualization system 106 generates the table 307*b* to include the dimension values 310*a*-310*h* corresponding to the selected dimension 309. As a result of the new attribution model indicated by the attribution-model indicator 321*a*, the attribution-visualization system 106 generates the table 307*b* to include modified event-quantity indicators 322*a*-322*h* corresponding to the selected event category 308.

In comparison to the event-quantity indicators 311*a*-311*h* within the attribution user interface 302*a* in FIG. 3A, the modified event-quantity indicators 322*a*-322*h* within the attribution user interface 302*d* in FIG. 3D demonstrate a change in distribution generated extemporaneously by the attribution-visualization system 106. As demonstrated here, the attribution-visualization system 106 can extemporaneously modify an attribution-distribution visualization given a user-indicated change to the attribution model.

As further shown in FIG. 3D, the attribution distribution 312*b* comprises a distribution of the modified event-quantity indicators 322*a*-322*h* across the dimension values 310*a*-310*h* according to the new attribution model (e.g., a custom-attribution model). In this embodiment, each of the modified event-quantity indicators 322*a*-322*h* correspond to one or more of a graphical-bar indicator, an event quantity (e.g., number of orders), and an event percentage (e.g., a percentage of orders). As indicated by the modified event-quantity indicator 322*a* in the attribution distribution 312*b*, the attribution-visualization system 106 attributes a set of event portions to the dimension value 310*a*. As indicated by the modified event-quantity indicators 322*b*-322*g*, the attribution-visualization system 106 attributes different sets of event portions to the dimension values 310*b*-310*h*, respectively.

As indicated by FIG. 3D, upon receiving user input to apply the custom-attribution model described above, the attribution-visualization system 104 queries a database (e.g., the analytics database 108) to access datasets corresponding to user actions/touchpoints and events. According to the custom-attribution model, the attribution-visualization system 104 attributes certain percentages of an event (e.g., an order) to the different user actions/touchpoints within the database. For instance, the attribution-visualization system 104 attributes 10% of an order to an email interaction of the user for the dimension value 310*a* (e.g., the first stored action associated with the user), 10% of the order to a paid search associated with the user for the dimension value 310*d* (e.g., the last stored action associated with the user), and the remaining 80% across all user actions/touchpoints that occurred between the email interaction and the paid search.

Figure 3E:
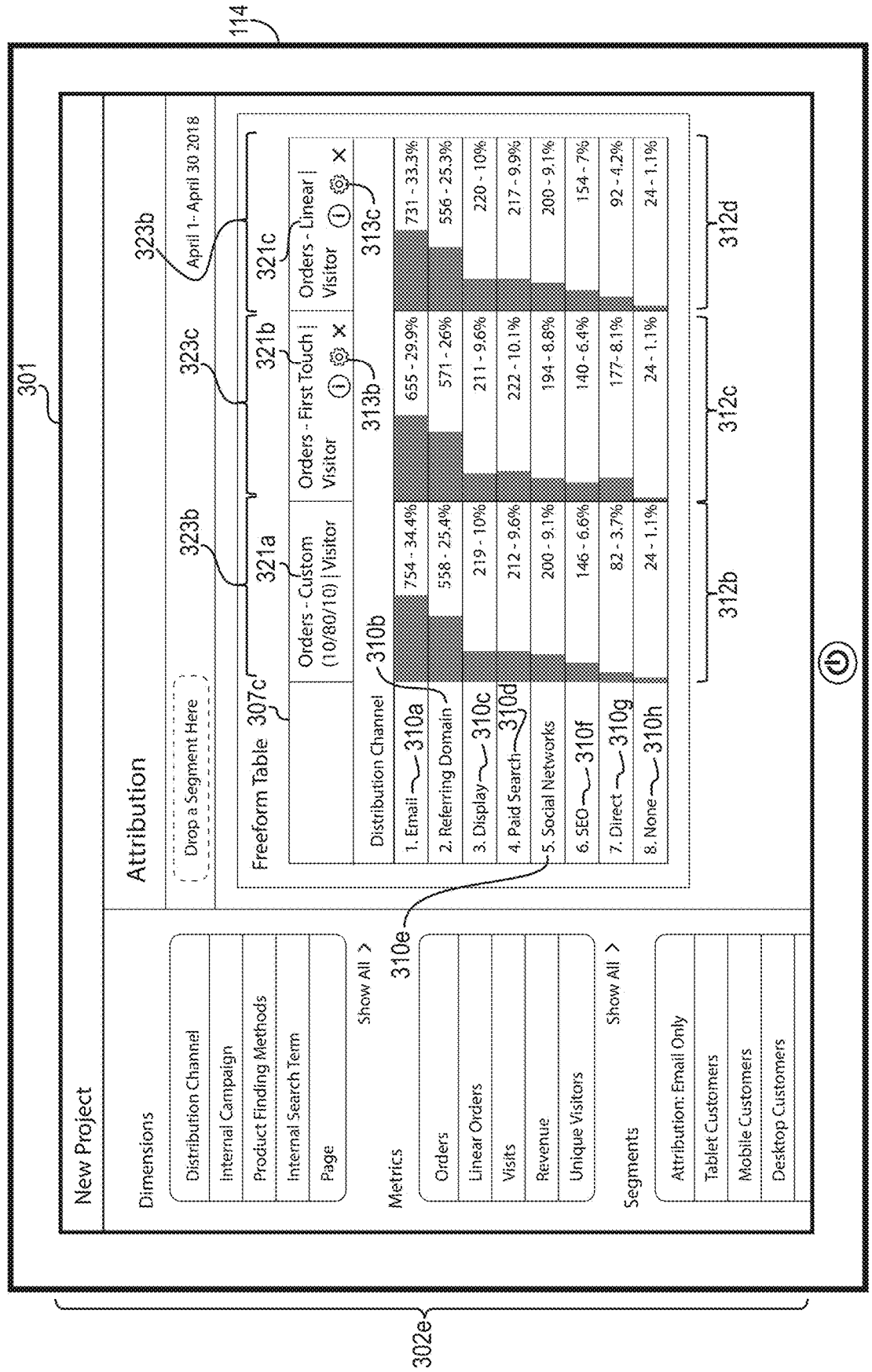

As suggested above, in some embodiments, the attribution-visualization system 106 generates visualizations that dynamically compare attribution distributions according to different attribution models. For example, in certain implementations, the attribution-visualization system 106 generates a visualization that compares attribution distributions of the same events across the same dimension values according to different attribution models. FIG. 3E provides an example of one such attribution-model-dimension-comparison visualization. In general, FIG. 3E illustrates the attribution-visualization system 106 generating attribution distributions 312b, 312c, and 312d for display within an attribution user interface 302e according to different attribution models.

As shown in FIG. 3E, the attribution-visualization system 106 adds columns 323c and 323d to a table 307c for additional attribution distributions. For example, in some embodiments, the attribution-visualization system 106 receives indications from the administrator device 114 of two copy-and-paste actions by the administrator 118 that twice copy-and-paste a column 323b to create the columns 323c and 323d. Alternatively, in some embodiments, the attribution user interface 302e includes add-column options that, when selected, cause the attribution-visualization system 106 to add columns to a table. By adding the columns 323c and 323d to the previously existing column 323b, the attribution-visualization system 106 modifies the table 307b to create the table 307c.

In addition to adding columns, the attribution-visualization system 106 further modifies the attribution models applied to datasets corresponding to the columns 323c and 323d. For example, in some embodiments, the attribution-visualization system 106 receives an indication of a selection of settings options 313b and 313c for the columns 323c and 323d, respectively, and user input identifying new attribution models to apply to the datasets corresponding to the columns 323c and 323d. In some such embodiments, the attribution-visualization system 106 modifies the attribution models for the columns 323c and 323d by executing the functions described above with reference to FIGS. 3B and 3C. By adding columns and modifying corresponding attribution models, the attribution-visualization system 106 creates a visualization that dynamically compares attribution models within the table 307c.

As further shown in FIG. 3E, the attribution-visualization system 106 generates the attribution distributions 312b, 312c, and 312d for display within the attribution user interface 302e according to different attribution models. Each of the attribution distributions 312b, 312c, and 312d indicate that the attribution-visualization system 106 applies different attribution models to events from a selected event category (e.g., orders) and a selected dimension (e.g., distribution channel). While the attribution distribution 312b remains unchanged from FIG. 3D, both the attribution distribution 312c and 312d in FIG. 3E represent new attribution distributions. As indicated by modified event-quantity indicators in the attribution distribution 312c, the attribution-visualization system 106 attributes a set of event portions to the dimension values 310a-310h according to an attribution model specified by an attribution-model indicator 321b. As indicated by different modified event-quantity indicators in the attribution distribution 312d, the attribution-visualization system 106 attributes a different set of event portions to the dimension values 310a-310h according to a different attribution model specified by an attribution-model indicator 321c.

To generate the attribution distribution 312c and 312d, for each of the dimension values 310a-310h, the attribution-visualization system 104 determines events from a selected event category are attributed to a dimension value from the dimension values 310a-310h—according to both a first attribution model for the attribution distribution 312c and a second attribution model for the attribution distribution 312d. Based on such determinations, the attribution-visualization system 104 attributes (i) a first set of events to the dimension value 310a according to the first attribution model and (ii) a second set of events to the dimension value 310a according to the second attribution model. The attribution-visualization system 104 similarly attributes different sets of events to the dimension values 310b-310h according to the first and second attribution models. Consequently, the modified event-quantity indicators in the attribution distribution 312c—and the modified event-quantity indicators in the attribution distribution 312d—indicate an attribution of events across the dimension values 310a-310h.

Figure 3F:
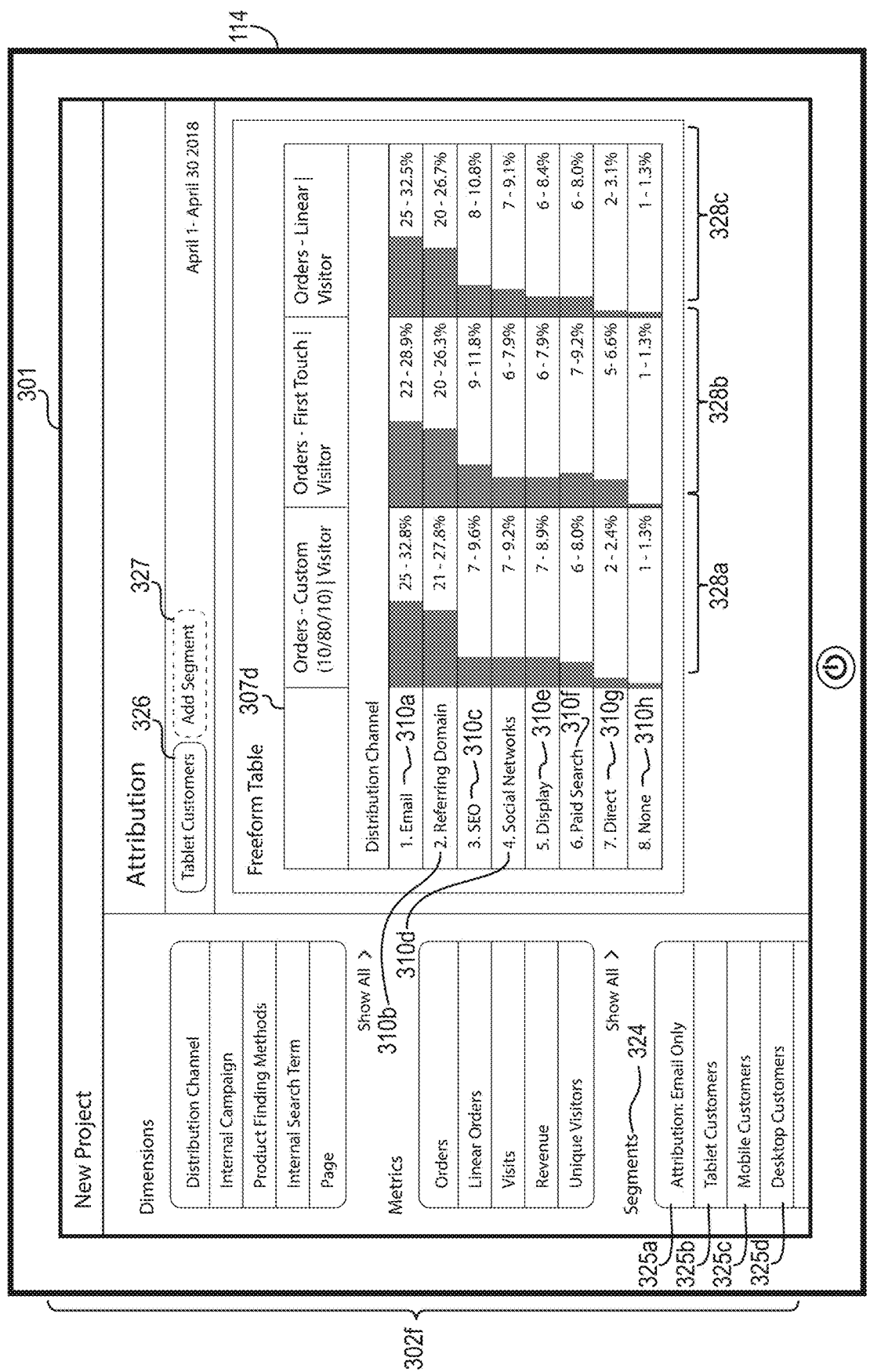
Figure 3G:
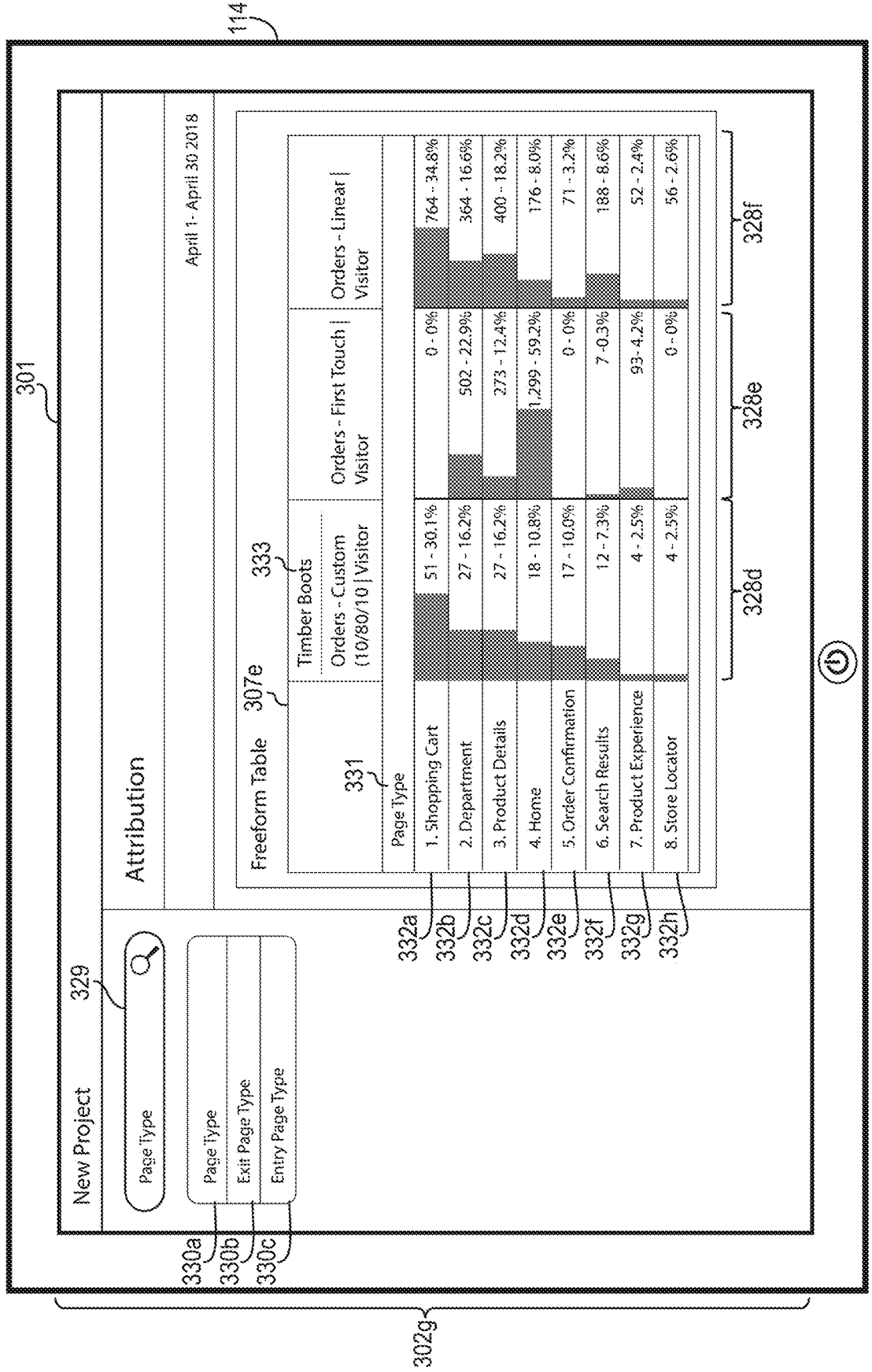
Figure 3H:
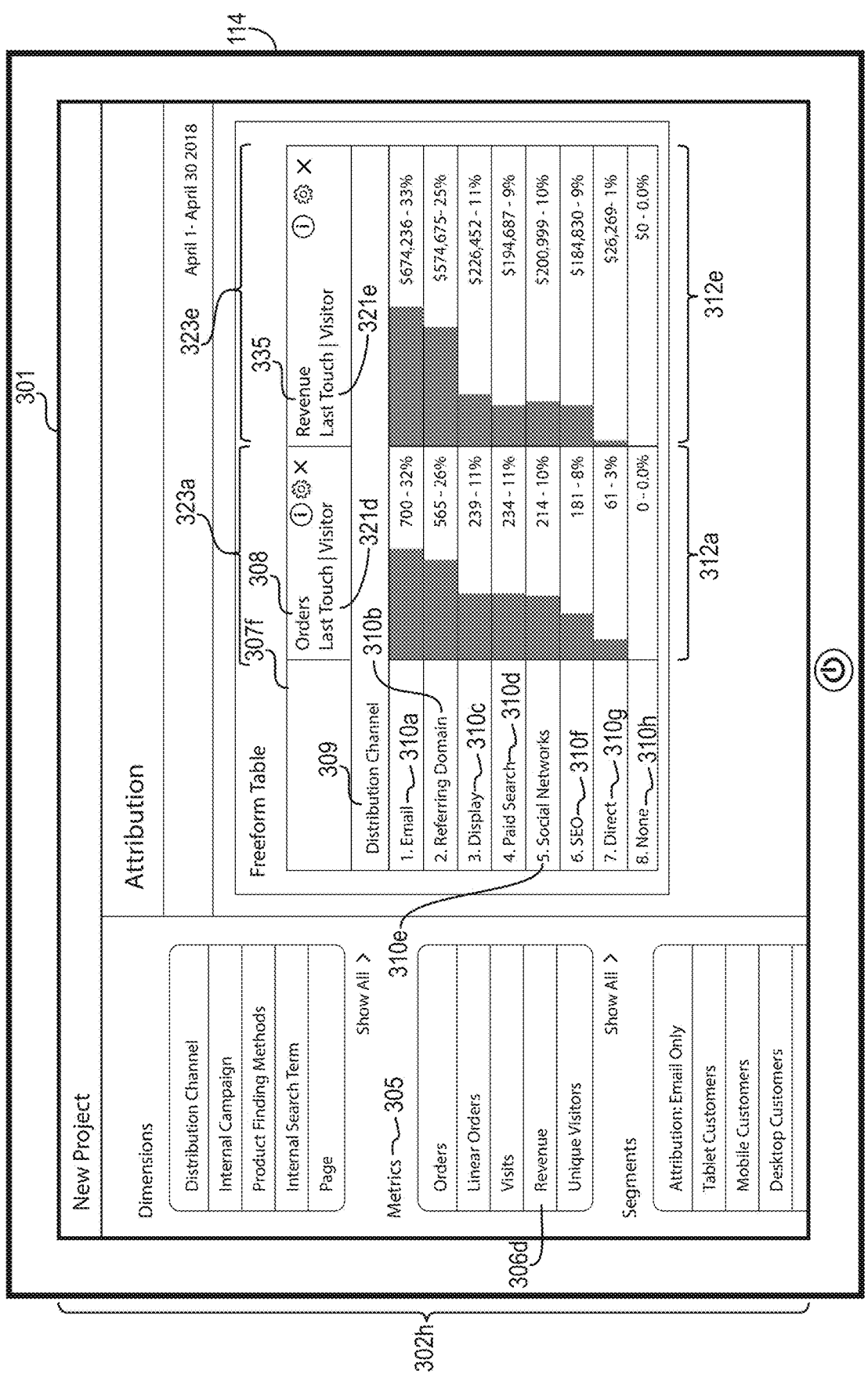

The changes from FIGS. 3D to 3E and the dynamic comparison depicted in FIG. 3E are merely examples. While FIG. 3E depicts the attribution-visualization system 106 comparing attribution distributions of the same events across the same dimension values according to different attribution models, the attribution-visualization system 106 can likewise create comparisons that modify event categories, dimensions, or other parameters. One such example is shown in FIG. 3H and described below.

As further suggested above, in some embodiments, the attribution-visualization system 106 generates visualizations that create or modify attribution distributions based on a segment of users corresponding to an event category. FIG. 3F illustrates an example of the attribution-visualization system 106 receiving user input identifying a segment of users corresponding to an event category. FIG. 3F further illustrates an example of the attribution-visualization system 106 providing for display within an attribution user interface 302f a modified attribution distribution that attributes a subset of events (corresponding to the segment of users) to dimension values according to an attribution model. As explained below, the attribution-visualization system 106 extemporaneously generates modified attribution distributions 328a, 328b, and 328c depicted in FIG. 3F based on a selected segment of users.

As shown in FIG. 3F, the administrator device 114 presents the attribution user interface 302f comprising a segment menu 324. The segment menu 324 includes segment options 325a-325d. In some embodiments, each of the segment options 325a-325d represent a selectable option that the administrator 118 can drag-and-drop into a table 307d, select for inclusion as a parameter within the table 307d, or search for within a search field (described below) for inclusion as a parameter within the table 307d.

Upon selection of one or more of the segment options 325a-325d, the attribution-visualization system 106 creates or modifies an attribution distribution based on a segment of users corresponding to the selected segment option. As shown in FIG. 3F, the administrator device 114 detects a selection of the segment option 325b and sends an indication of the selection to the attribution-visualization system 106. The attribution-visualization system 106 in turn provides modified attribution distributions 328a, 328b, and 328c for display within the attribution user interface 302f. The attribution-visualization system 106 further adds a segment indicator 326 within the attribution user interface 302f indicating a segment of users selected by the administrator 118 relevant to the modified attribution distributions 328a, 328b, and 328c. As indicated by an additional segment field 327, the attribution-visualization system 106 can add additional segments of users upon selection.

The modified attribution distributions 328a, 328b, and 328c shown in FIG. 3F represent modified attribution distributions of the attribution distributions 312b, 312c, and 312d shown in FIG. 3D, respectively. As indicated by modified event-quantity indicators in the modified attribution distribution 328a, the attribution-visualization system 106 attributes subsets of events corresponding to the segment of users to the dimension values 310a-310h according to a first attribution model. As indicated by different modified event-quantity indicators in the modified attribution distribution 328b, the attribution-visualization system 106 attributes different subsets of events corresponding to the segment of users to the dimension values 310a-310h according to a second attribution model. As indicated by additional modified event-quantity indicators in the modified attribution distribution 328c, the attribution-visualization system 106 attributes additional subsets of events corresponding to the segment of users to the dimension values 310a-310h according to a third attribution model.

In addition (or in the alternative) to modifying an attribution visualization according to a segment of users, in certain implementations, the attribution-visualization system 106 can filter by dimension. For example, in some embodiments, the attribution-visualization system 106 receives user input indicating a dimension filter that identifies a subset of dimension values from a plurality of dimension values. Based on the dimension filter, the attribution-visualization system 106 provides a modified attribution distribution of a subset of events from the plurality of events across the subset of dimension values according to an attribution model.

In some such embodiments, the dimension filter identifies a subset of dimension values within a dimension by a user selection or entry of: space-delimited values in a particular order within or related to a dimension value; a phrase within or related to a dimension value; a term within or related to a dimension value; an express exclusion of a phrase or a term within a dimension value; an exact match of a value within a dimension value; or dimension values that start or end with a particular character, phrase, or term. Additionally, or alternatively, the dimension filter identifies a subset of dimension values that satisfy an attribution threshold, such as by returning or displaying dimension values to which a threshold number or percentage of events have been attributed.

As further suggested above, in some embodiments, the attribution-visualization system 106 generates visualizations that add, create, or modify attribution distributions based on a new dimension. FIG. 3G illustrates an example of the attribution-visualization system 106 receiving user input identifying a new dimension and generating modified attribution distributions of events across new dimension values according to different attribution models. As shown in FIG. 3G, the attribution-visualization system 106 extemporaneously generates modified attribution distributions 328d, 328e, and 328f for display within an attribution user interface 302g based on a new dimension selected by the administrator 118.

As suggested above, in certain implementations, the attribution-visualization system 106 identifies a dimension based on a dimension option selected from the dimension menu 303 in FIG. 3A. As indicated in FIG. 3G, the attribution-visualization system 106 can also identify a dimension (or event category, product, or segment of users) based on searches within a search field 329. As shown within the attribution user interface 302g, the attribution-visualization system 106 provides the search field 329 for searches of dimensions, event categories, products, segments of users, or other parameters. As indicated by FIG. 3G, in some embodiments, the administrator device 114 detects terms input within the search field 329 and provides selectable search results 330a-330c based on the terms within the search field 329. In this particular embodiment, each of the selectable search results 330a-330c represent a dimension option corresponding to a dimension. Depending on the search terms, however, the attribution-visualization system 106 may also provide options corresponding to event categories, products, or segments of users based on a search.

Upon selection of one or more of the dimension options in the selectable search results 330a-330c, the attribution-visualization system 106 creates or modifies a dimension for an attribution distribution. As shown in FIG. 3F, for instance, the administrator device 114 detects a selection of the selectable search result 330a and sends an indication of the selection to the attribution-visualization system 106. In some such embodiments, the administrator device 114 detects a drag-and-drop action of the selectable search result 330a into a table 307e within the attribution user interface 302g. The attribution-visualization system 106 provides for display within the attribution user interface 302g a few modification attribution distributions—that is, modified attribution distributions 328d, 328e, and 328f. Based on the selectable search result 330a, the attribution-visualization system 106 further modifies a selected dimension within the table 307e to become a modified dimension 331. The modified dimension 331 indicates the dimension used for the modified attribution distributions 328d, 328e, and 328f.

In addition (or in the alternative) to modifying a dimension or event category, the attribution-visualization system 106 can modify an event category to be product specific. As indicated by FIG. 3G, for example, the attribution-visualization system 106 receives an indication from the administrator device 114 of a selection of a product corresponding to an event category. In some such embodiments, the administrator device 114 detects a drag-and-drop action of a product option into a column of the table 307e corresponding to the modified attribution distribution 328d. Based on receiving an indication of such a selection, the attribution-visualization system 106 provides a product indicator 333 corresponding to the modified attribution distribution 328d for display within the attribution user interface 302g. The attribution-visualization system 106 further provides the modified attribution distribution 328d for display within the attribution user interface 302g based on the selected product.

The modified attribution distributions 328d, 328e, and 328f shown in FIG. 3G represent attribution distributions with further changes to the modified attribution distributions 328a, 328b, and 328c shown in FIG. 3F, respectively, but without the segment of users. As indicated by modified event-quantity indicators in the modified attribution distribution 328d, the attribution-visualization system 106 attributes subsets of events corresponding to a selected product to new dimension values 332a-332h according to a first attribution model. The new dimension values 332a-332h correspond to the modified dimension 331. As indicated by different modified event-quantity indicators in the modified attribution distribution 328e, the attribution-visualization system 106 attributes different subsets of events to the new dimension values 332a-332h according to a second attribution model. As indicated by additional modified event-quantity indicators in the modified attribution distribution 328f, the attribution-visualization system 106 attributes additional subsets of events to the new dimension values 332a-332h according to a third attribution model.

As further suggested above, in some implementations, the attribution-visualization system 106 generates visualizations that add, create, or modify attribution distributions based on a new event category. FIG. 3H illustrates an example of the attribution-visualization system 106 receiving user input identifying a new event category and generating an additional attribution distribution of new events across dimension values according to an attribution model. As shown in FIG. 3H, the attribution-visualization system 106 extemporaneously generates an attribution distribution 312e—in addition to the attribution distribution 312a—for display within an attribution user interface 302h based on a new event category selected by the administrator 118. For explanatory purposes, the following description uses the table 307a from FIG. 3A as a reference point.

As shown in FIG. 3H, the attribution-visualization system 106 adds column 323e to a table 307f for an additional attribution distribution. For example, in some embodiments, the attribution-visualization system 106 receives an indication from the administrator device 114 of a copy-and-paste action by the administrator 118 that copies and pastes the column 323a to create the column 323e. By adding the column 323e to the previously existing column 323a, the attribution-visualization system 106 modifies the table 307a from FIG. 3A to create the table 307f in FIG. 3H.

As noted above, in certain implementations, the attribution-visualization system 106 identifies an event category based on an event-category option selected from the event-category menu 305 in FIG. 3A. Upon detecting a selection of the event-category option 306d shown in FIG. 3H, the administrator device 114 sends an indication of the selection to the attribution-visualization system 106 to include a corresponding event category in an attribution distribution corresponding to the column 323e. In some such embodiments, for instance, the administrator device 114 detects a drag-and-drop action of the event-category option 306d into the column 323e. Based on receiving an indication of such a selection for the column 323e, the attribution-visualization system 106 provides the attribution distribution 312e—in addition to the attribution distribution 312a—for display within the attribution user interface 302h.

The attribution distribution 312e shown in FIG. 3H provides a dynamic comparison with the attribution distribution 312a based on different event categories. As indicated by event-quantity indicators in the attribution distribution 312a, the attribution-visualization system 106 attributes events corresponding to the selected event category 308 to the dimension values 310a-310h according to an attribution model. As shown in FIG. 3H, the attribution distribution 312a includes events corresponding to the selected event category 308 distributed according to an attribution model specified by an attribution-model indicator 321d. As indicated by different event-quantity indicators in the attribution distribution 312e, the attribution-visualization system 106 attributes different events to the dimension values 310a-310h according to the same attribution model. Here, the attribution distribution 312e includes events corresponding to a new selected event category 335 distributed according to the same attribution model specified by an attribution-model indicator 321e.

In addition (or in the alternative) to the various visualizations and functions described above with reference to FIGS. 3A-3H, the attribution-visualization system 106 can integrate attribution models with a variety of analytics tools provided by the analytics system 104. As indicated by the visualization-settings element 314 in FIG. 3A, for example, in some embodiments, the attribution-visualization system 106 provides a visual indication of anomalies in an attribution distribution that are different from or inconsistent with previous attributions. In some implementations, for instance, the attribution-visualization system 106 provides a visual indication that events attributed to a dimension value are inconsistent with previous attribution distributions that attribute the same or similar events (e.g., events of the same category or concerning the same product) to the same or similar dimension values (e.g., dimension values of the same category). In some such embodiments, the visual indication notifies that events attributed to a dimension value are inconsistent with previous attribution distributions within a threshold number or percentage (e.g., a threshold number of orders or revenue or a threshold percentage of orders or revenue). Further, in some cases, the attribution-visualization system 106 provides a potential explanation for a detected anomaly for an attribution distribution based on a contribution analysis.

As noted above, in certain embodiments, the attribution-visualization system 106 extemporaneously generates different attribution distributions of events across dimension values according to different attribution models. FIGS. 4A-4D illustrate the administrator device 114 presenting graphical user interfaces comprising visualizations for attribution distributions according to differing attribution models and various attribution visualizations according to one or more attribution models. Accordingly, the attribution-visualization system 106 integrates one or more attribution models as native components of various graphical user interfaces shown in FIGS. 4A-4D (e.g., where the attribution models function as event categories). As described below, FIGS. 4A-4D depict graphical user interfaces from the perspective of the administrator device 114 implementing computer-executable instructions of the analytics application 116 to perform certain actions for the attribution-visualization system 106.

Figure 4A:
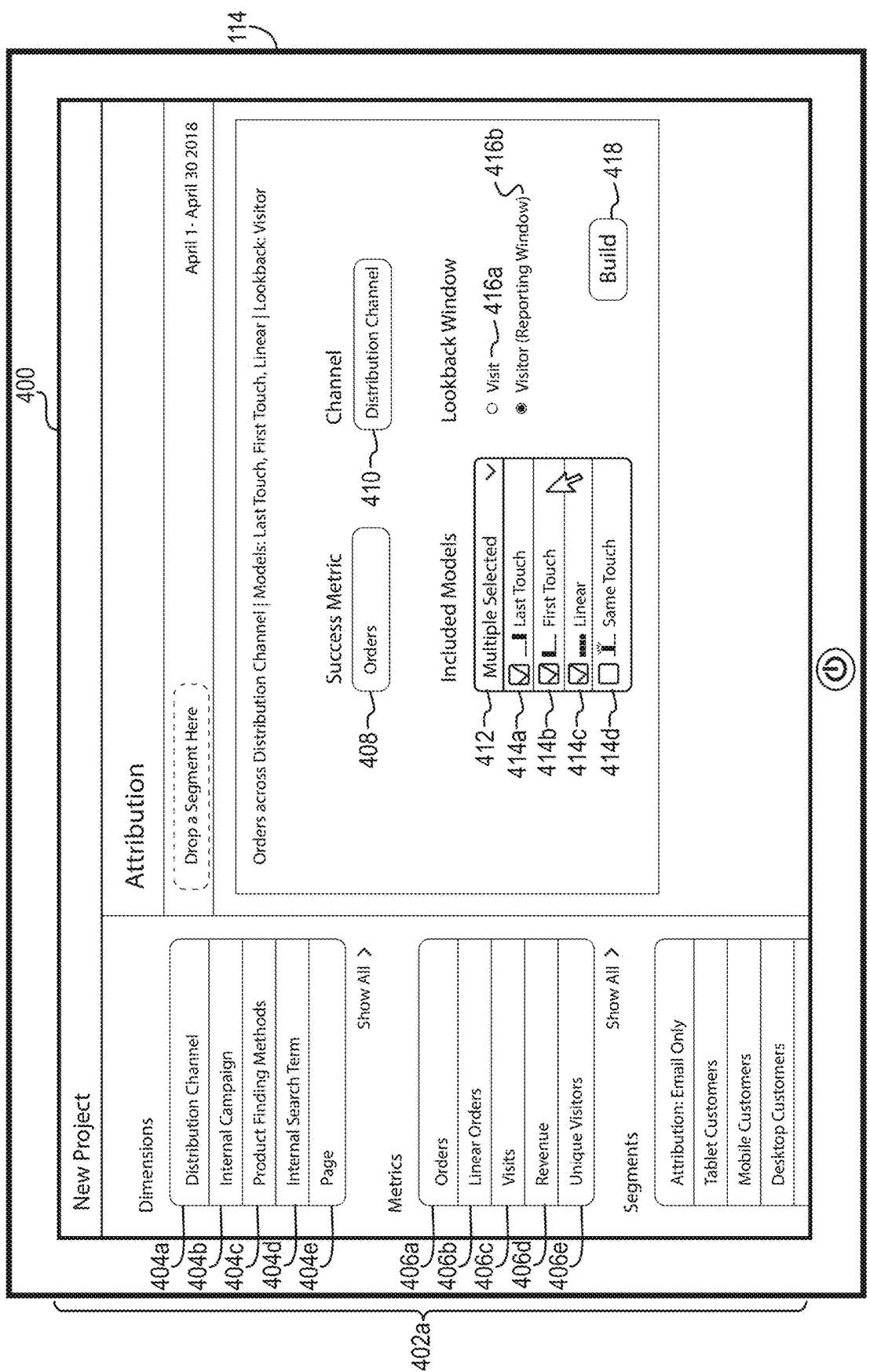
FIGS. 4A-4D illustrate graphical user interfaces of a client device presenting visualizations for attribution distributions according to differing attribution models and various attribution visualizations according to one or more attribution models in accordance with one or more embodiments.

As shown in FIG. 4A, for instance, the administrator device 114 presents an attribution user interface 402a of the analytics application 116 within a screen 400. The attribution user interface 402a includes dimension options 404a-404e corresponding to different dimensions and event-category options 406a-406e corresponding to different event categories. As indicated by FIG. 4A, the administrator device 114 detects a selection of the dimension option 404a and a selection of the event-category option 406a. Based on receiving an indication of such selections from the administrator device 114, the attribution-visualization system 106 provides a selected dimension indicator 410 and a selected-event-category indicator 408 for display within the attribution user interface 402a. The selected dimension indicator 410 identifies a dimension corresponding to the dimension option 404a, and the selected-event-category indicator 408 identifies an event category corresponding to the event-category option 406a.

Figure 4B:
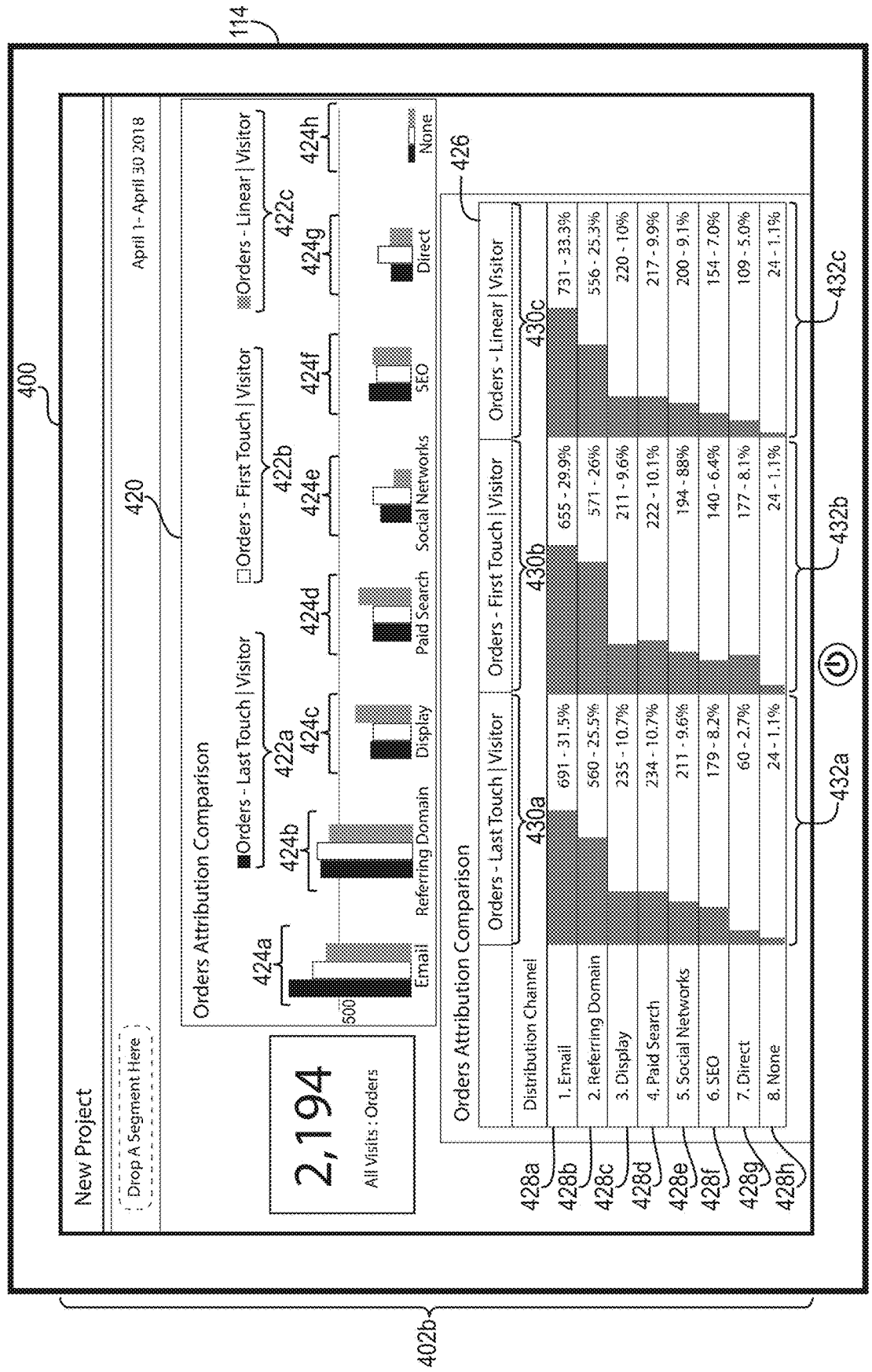

As further depicted in FIG. 4B, the attribution-visualization system 106 provides an attribution-model selector 412 for display within the attribution user interface 402a. The attribution-model selector 412 enables selection of multiple attribution models for simultaneous application in a visualization. For example, in certain embodiments, the attribution-model selector 412 comprises a drop-down menu of attribution-model options 414a-414d. In some such embodiments, the attribution-model selector 412 includes attribution-model options for each attribution model described in this disclosure. As further indicated by FIG. 4B, the administrator device 114 detects selections of the attribution-model options 414a, 414b, and 414c for the attribution-visualization system 106 to apply to datasets corresponding to the selected dimension and the selected event category in attribution visualizations.

In addition to the attribution-model selector 412, the attribution-visualization system 106 further provides lookback-window options 416a and 416b for display within the attribution user interface 402a. The lookback-window options 416*a* and 416*b* correspond to different lookback windows for grouping events or hits to which an attribution model applies. The lookback-window options 416*a* and 416*b* function similar to the lookback-window options 319*a* and 319*b* from FIG. 3C. As indicated by FIG. 4A, the attribution-visualization system 106 receives an indication of a selection of the lookback-window option 416*b* from the administrator device 114.

In addition to the attribution-model selector 412 and the lookback-window options 416*a* and 416*b*, the attribution user interface 402*a* includes a visualization-generation option 418. Upon receiving an indication of a selection of the visualization-generation option 418, the attribution-visualization system 106 can extemporaneously generate attribution visualizations based on the parameters indicated by the attribution-model selector 412, the selected dimension indicator 410, and the selected-event-category indicator 408. FIG. 4B illustrates examples of some such attribution visualizations.

As shown in FIG. 4B, the attribution-visualization system 106 generates a model-dimension-comparison visualization 420 and a comparison table 426 comparing attributions according to different attribution models—for display within the attribution user interface 302*f*. The attribution-visualization system 106 generates both the model-dimension-comparison visualization 420 and the comparison table 426 based on the selected attribution models, dimension, and event category indicated in FIG. 4A. Both visualizations provide a different way of comparing attribution models.

As further indicated in FIG. 4B, the model-dimension-comparison visualization 420 groups attribution of events for multiple attribution models by particular dimension values. For example, the model-dimension-comparison visualization 420 includes an attribution grouping 424*a* of events attributed to a dimension value 428*a* according to multiple attribution models. Similarly, the attribution groupings 424*b*-424*h* include events attributed to dimension values 428*b*-424*h*, respectively, according to multiple attribution models. Here, the attribution groupings 424*a*-424*h* each include bars indicating a quantity of events attributed to the corresponding dimension value by different attribution models.

As shown by attribution-parameter indicators 422*a*, 422*b*, and 422*c* within the attribution user interface 402*b*, the attribution groupings 424*a*-424*h* each include event attributions according to attribution-parameter sets, where each parameter set comprises a selected event category, attribution model, and lookback window. In particular, each of the attribution groupings 424*a*-424*h* include event attributions according to different parameter sets indicated by the attribution-parameter indicators 422*a*, 422*b*, and 422*c*. In some embodiments, the attribution-parameter indicators 422*a*, 422*b*, and 422*c* include a visual indicator (e.g., a color or pattern) indicating the bar to which each attribution-parameter set corresponds within the attribution groupings 424*a*-424*h*.

As further indicated by FIG. 4B, the model-dimension-comparison visualization 420 and its constituent attribution groupings 424*a*-424*h* provide a dynamic way of comparing attributions of events to dimension values according to different attribution models. In some embodiments, for example, upon detecting a selection of a bar within the attribution grouping 424*a*, the administrator device 114 presents an event quantity attributed to the dimension value 428*a* (e.g., in terms of number of orders). Similarly, upon detecting a selection of a bar within any of the attribution groupings 424*b*-424*h*, the administrator device 114 presents an event quantity attributed to a corresponding dimension value from the dimension values 428*b*-424*h*.

As further shown in FIG. 4B, the attribution-visualization system 106 extemporaneously generates attribution distributions 432*a*, 432*b*, and 432*c* within the comparison table 426 based on the selected attribution models, dimension, and event category indicated in FIG. 4A. As shown by attribution-parameter indicators 430*a*, 430*b*, and 430*c* within the comparison table 426, each of the attribution distributions 432*a*, 432*b*, and 432*c* include a distribution according to a different attribution-parameter set, where each parameter set comprises a selected event category, attribution model, and lookback window.

Each of the attribution distributions 432*a*, 432*b*, and 432*c* also include a different distribution of events from the selected event category across dimension values from the selected dimension. As indicated by event-quantity indicators in the attribution distribution 432*a*, for instance, the attribution-visualization system 106 attributes a first set of event portions to the dimension values 428*a*-424*h* according to a first attribution model. As indicated by event-quantity indicators in the attribution distribution 432*b*, by contrast, the attribution-visualization system 106 attributes a second set of event portions to the dimension values 428*a*-424*h* according to a second attribution model. And as indicated by event-quantity indicators in the attribution distribution 432*c*, the attribution-visualization system 106 attributes a third set of event portions to the dimension values 428*a*-424*h* according to a third attribution model.

In some embodiments, the attribution-visualization system 106 links the comparison table 426 to the model-dimension-comparison visualization 420. For instance, upon detecting a user selection of (or cursor hover over) the dimension value 428*a* within the comparison table 426, the administrator device 114 visually indicates that the attribution grouping 424*a* corresponds to the dimension value 428*a*. In some such embodiments, the administrator device 114 highlights the attribution grouping 424*a* or displays the attribution grouping 424*a* in a crisper or darker color while fading colors corresponding to the attribution groupings 424*b*-424*h*. A user selection of (or cursor hover over) the dimension values 428*b*-424*h* within the comparison table 426 similarly causes the administrator device 114 to indicate that the attribution groupings 424*a*-424*h* correspond to the dimension values 428*b*-424*h*, respectively.

Figure 4C:
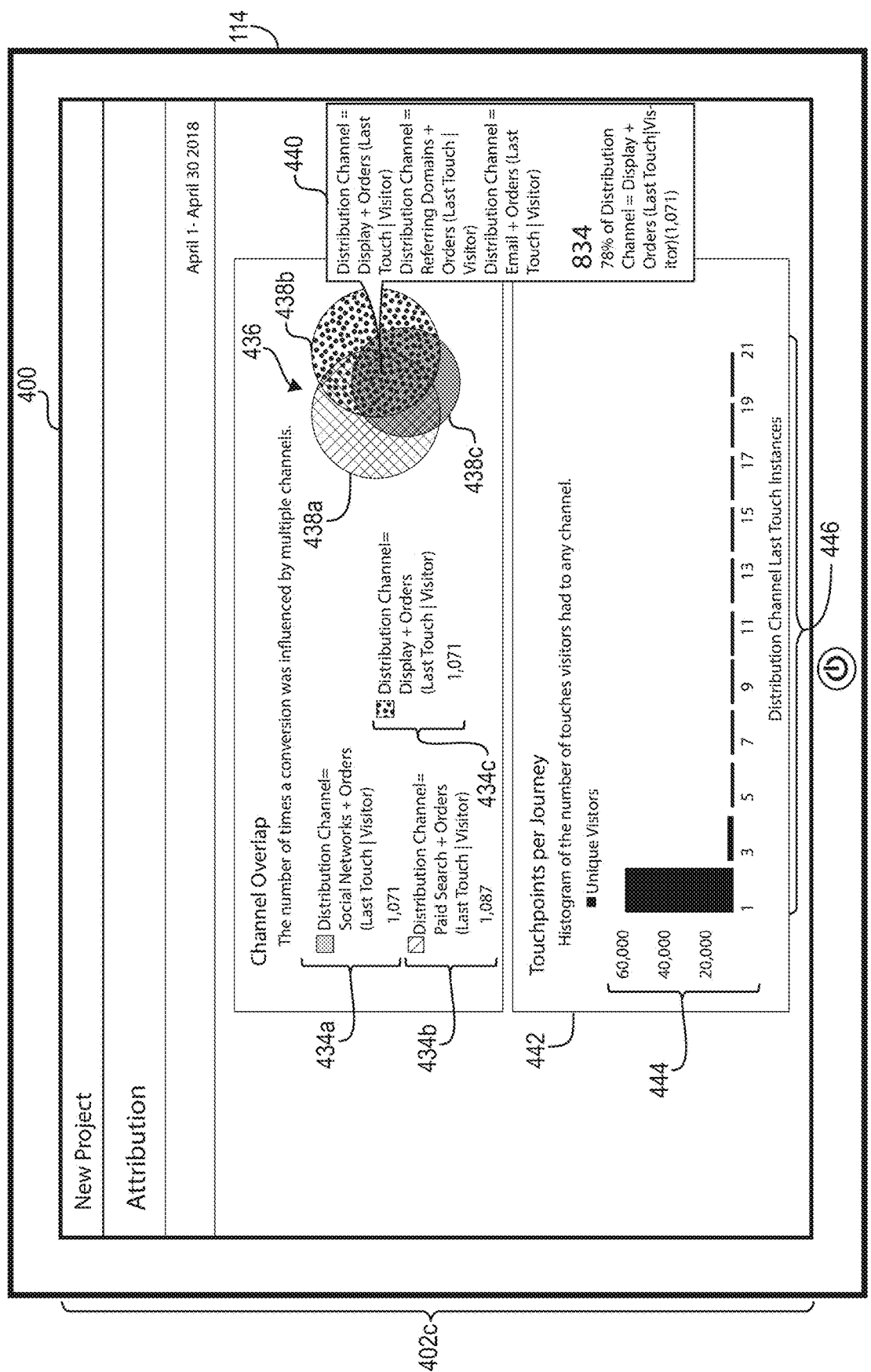

As indicated above, in addition (or in the alternative) to a model-dimension-comparison visualization or a comparison table, the attribution-visualization system 106 can generate a variety of attribution visualizations. FIG. 4C illustrates examples of some such attribution visualizations, including a channel-overlap visualization 436 and a touchpoint histogram 442. The attribution-visualization system 106 generates both the channel-overlap visualization 436 and the touchpoint histogram 442 within an attribution user interface 402*c* based on the selected attribution models, dimension, and event category indicated in FIG. 4A.

As shown in FIG. 4C, the attribution-visualization system 106 generates the channel-overlap visualization 436 comprising channel circles 438*a*-438*c* indicating how various distribution channels overlap in influencing events (e.g., conversion events such as orders). In some such embodiments, the attribution-visualization system 106 provides the channel-overlap visualization 436 as a Venn diagram. While the channel-overlap visualization 436 depicted in FIG. 4C uses distribution channels as dimension values, in some embodiments, the attribution-visualization system 106 generates dimension-overlap visualizations for any dimension value described herein, such as age-overlap visualizations, product-overlap visualizations, geographic-overlap visualizations, or page-overlap visualizations.

As indicated by FIG. 4C, the channel circles 438a, 438b, 438c respectively correspond to distribution-channel indicators 434b, 434c, and 434a. Each of the distribution-channel-indicators 434a, 434b, and 434c in turn comprise a distribution channel and a corresponding event category, attribution model, and lookback window. Accordingly, the channel-overlap visualization 436 visually indicates events for which multiple distribution channels receive attribution—according to a particular event category, attribution model, and lookback window.

In some embodiments, the attribution-visualization system 106 generates the channel-overlap visualization 436 to be interactive. For example, upon detecting a user selection of (or cursor hover over) the channel circle 438a, the administrator device 114 visually indicates within the attribution user interface 402c an event quantity (e.g., a number or percentage of orders) attributed to a corresponding distribution channel (e.g., paid search). Similarly, upon detecting user selection of (or cursor hovers over) the channel circles 438b and 438c, the administrator device 114 visually indicates within the attribution user interface 402c event quantities attributed to corresponding distribution channels (e.g., displays, social networks).

Additionally, or alternatively, in some implementations, the attribution-visualization system 106 generates the channel-overlap visualization 436 comprising a channel-overlap indicator 440 that functions as an interactive element. For example, upon detecting a user selection of (or cursor hover over) an area in the channel-overlap visualization 436 at which the channel circles 438a-438c each overlap, the administrator device 114 presents the channel-overlap indicator 440 within the attribution user interface 402c. As shown in FIG. 4C, the channel-overlap indicator 440 indicates a quantity of events (e.g., number of orders) or an event percentage (e.g., a percentage of orders) for which multiple distribution channels receive attribution—according to a particular event category, attribution model, and lookback window.

In addition to being interactive, in some embodiments, the attribution-visualization system 106 generates the channel-overlap visualization 436 to be adjustable. For example, in certain implementations, the attribution-visualization system 106 modifies or updates the channel-overlap visualization 436 to include channel circles corresponding to different distribution channels selected by the administrator 118. Upon receiving indications from the administrator device 114 of user selection of the dimension values 428a, 428b, and 428c from the comparison table 426, for instance, the attribution-visualization system 106 modifies or updates channel circles for the channel-overlap visualization to correspond to the dimension values 428a, 428b, and 428c and associated event categories, attribution models, and lookback windows.

As further shown in FIG. 4C, the attribution-visualization system 106 provides the touchpoint histogram 442 for display within the attribution user interface 402c. The touchpoint histogram 442 generally indicates a number of touches that unique visitors had through any distribution channel corresponding to events (e.g., within an application or a website). As indicated by the touchpoint histogram 442, the attribution-visualization system 106 indicates that unique visitors (corresponding to events from a selected event category) have from 1 to 21+ touches through collective distribution channels (e.g., user interactions through email, referring domain, display, paid search, social networks, or search engine optimization).

In particular, the touchpoint histogram 442 includes a visitors axis 444 and a touch-instances axis 446. The visitors axis 444 indicates a number of unique visitors corresponding to each number along the touch-instances axis 446. Conversely, the touch-instances axis 446 indicates instances of touches through any distribution channel collectively according to an attribution model (e.g., a last-touch model). According to the visitors axis 444 and the touch-instances axis 446, for instance, approximately 60,000 unique visitors have had between 1 and 3 instances of touchpoints (from any distribution channel) according to the selected attribution model. By contrast, approximately 1,000 unique visitors have had between 3 and 5 instances of touchpoints (from any distribution channel) according to the selected attribution model.

The touchpoint histogram 442 depicted in FIG. 4C is merely an example. While the touchpoint histogram 442 here uses unique visitors and a last-touch model for touchpoints, the attribution-visualization system 106 can use visits and any attribution model for touchpoints in a touchpoint histogram.

Figure 4D:
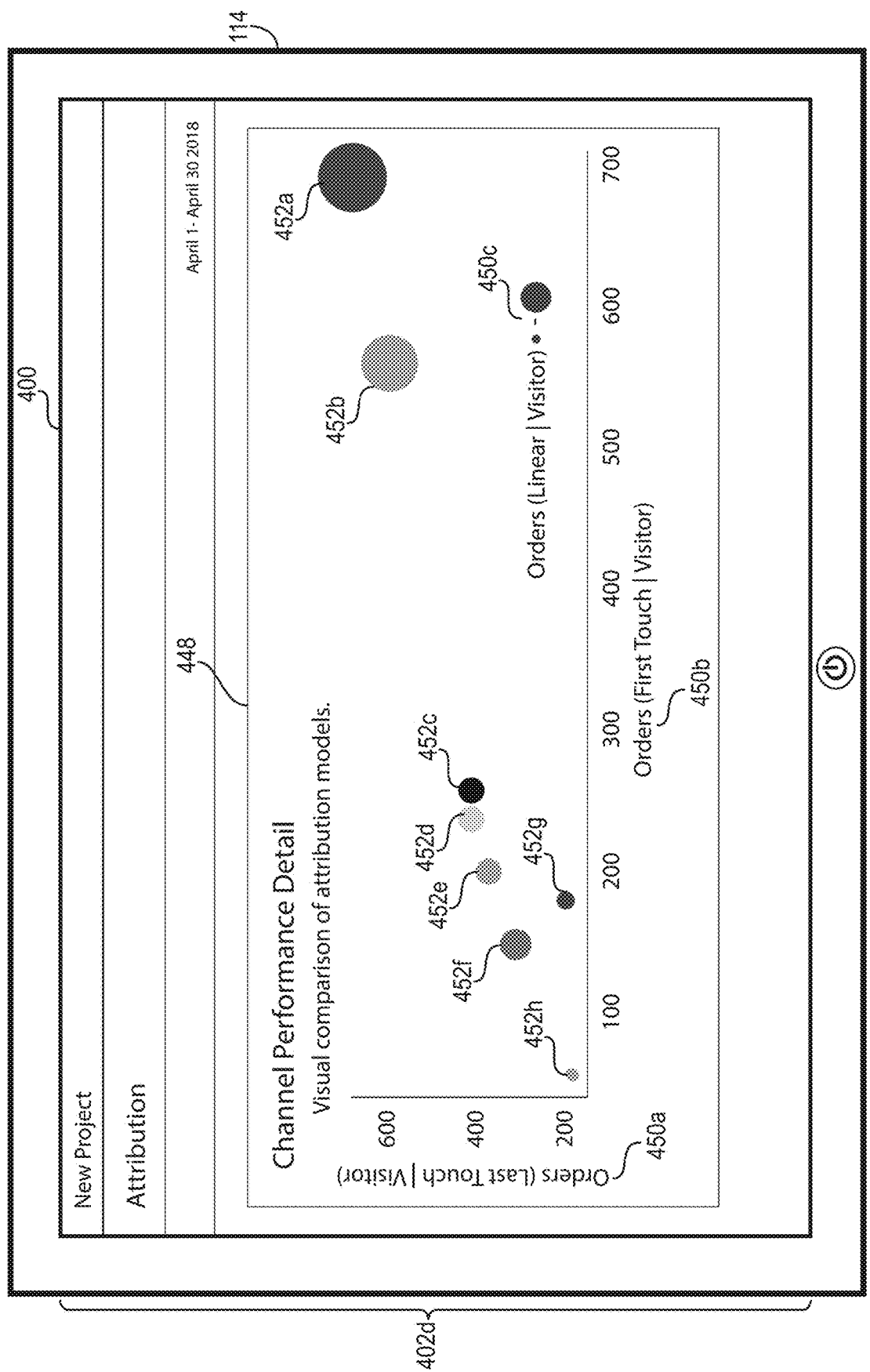

In addition (or in the alternative) to the attribution visualizations described above, in some embodiments, the attribution-visualization system 106 generates a model-comparison plot to facilitate comparing attribution models. FIG. 4D illustrates an example of a model-comparison plot 448 as a three-dimensional scatter plot. The attribution-visualization system 106 generates the model-comparison plot 448 within an attribution user interface 402d based on the selected attribution models, dimension, and event category indicated in FIG. 4A.

As shown in FIG. 4D, the attribution-visualization system 106 generates the model-comparison plot 448 comprising distribution-channel dots 452a-452h distributed or scattered across multiple axes. The distribution-channel dots 452a-452h respectively correspond (and link) to the dimension values 428a-424h within the comparison table 426 from FIG. 4B. Further, each of the distribution-channel dots 452a-452h visually indicate a quantity of events (e.g., number of orders) attributed to the dimension values 428a-424h according to different attribution models.

As further indicated by FIG. 4D, the attribution-visualization system 106 distributes or scatters the distribution-channel dots 452a-452h across attribution-event axes 450a, 450b, and 450c within the model-comparison plot 448. As indicated by the model-comparison plot 448, the attribution-event axis 450a represents an ordinate axis of events numbered by quantity (e.g., number of orders) corresponding to a first attribution model and a lookback window. By contrast, the attribution-event axis 450b represents an abscissa axis of events numbered by quantity (e.g., number of orders) corresponding to a second attribution model and the lookback window. Further, the attribution-event axis 450c represents an applicate axis of events numbered by quantity (e.g., number of orders) corresponding to a third attribution model and the lookback window. To indicate the applicate axis of events, each of the distribution-channel dots 452a-452h vary in radius. In other words, the larger the radius of the distribution-channel dot, the higher quantity of events correspond to the distribution-channel dot along the attribution-event axis 450c.

According to the attribution-event axes 450a-450c within the model-comparison plot 448, for instance, the attribution-visualization system 106 visually indicates that the channel-distribution dot 452*a* corresponds to 691 events attributed to the dimension value 428*a* according to the first attribution model (e.g., last-touch model), 655 events attributed to the dimension value 428*a* according to the second attribution model (e.g., first-touch model), and 731 events attributed to the dimension value 428*a* according to the third attribution model (e.g., linear model). According to the attribution-event axes 450*a*-450*c*, the attribution-visualization system 106 also visually indicates that the channel-distribution dots 452*b*-452*h* correspond to various events attributed to the dimension values 428*b*-428*h* according to the different attribution models.

The model-comparison plot 448 depicted in FIG. 4D is merely an example. While the model-comparison plot 448 uses orders for an event category and a last-touch model, a first-touch model, and a liner model for the first, the second, and the third attribution models, the attribution-visualization system 106 can use events from any event category and any attribution model for a model-comparison plot.

As suggested above, in some embodiments, the attribution-visualization system 106 links attribution visualizations shown in FIGS. 4B-4D to each other to facilitate extemporaneous modification. For example, upon detecting user input modifying selections from among the attribution-model options 414*a*-414*d* in FIG. 4A, in some embodiments, the attribution-visualization system 106 also modifies one or more attribution models corresponding to (i) the attribution-parameter indicators 422*a*-422*c* from the model-dimension-comparison visualization 420 in FIG. 4B, (ii) the attribution-parameter indicators 430*a*-430*c* from the comparison table 426 in FIG. 4B, (iii) the attribution models indicated within the distribution-channel indicators 434*a*-434*c* for the channel-overlap visualization 436 in FIG. 4C, or (iv) the attribution-event axes 450*a*-450*c* for the model-comparison plot 448 in FIG. 4D—to reflect the modified attribution models.

Similarly, upon detecting user input modifying a selected dimension corresponding to the selected dimension indicator 410 in FIG. 4A (or modifying some or all of the dimension values 428*a*-428*h* from the comparison table 426 in FIG. 4B), in some embodiments, the attribution-visualization system 106 also modifies one or more of (i) the attribution groupings 424*a* 424*h* in the model-dimension-comparison visualization 420 in FIG. 4B, (ii) the distribution-channel indicators 434*a*-434*c* for the channel-overlap visualization 436 in FIG. 4C, or (iii) the distribution-channel dots 452*a*-452*h* in the model-comparison plot 448 in FIG. 4D—to reflect the modified dimension. The attribution-visualization system 106 can make similar modifications to events or event categories indicated within one or more of the model-dimension-comparison visualization 420, the comparison table 426, the channel-overlap visualization 436, the touchpoint histogram 442, or the model-comparison plot 448.

The various attribution visualizations depicted in FIGS. 4B-4D are merely examples. The attribution-visualization system 106 can likewise generate various other attribution visualizations for display within an attribution user interface. For example, in some embodiments, the attribution-visualization system 106 generates an attribution-flow diagram comprising dimension graphics demonstrating a flow of users from one or more dimension values (e.g., first, second, and third distribution channels) to another dimension value (e.g., a fourth distribution channel) and vice versa. In some cases, upon user selection, the attribution-visualization system 106 limits the attribution-flow diagram to interactions resulting in a conversion (e.g., order).

In some such embodiments, the attribution-flow diagram includes visual indicators of a quantity of users moving from one dimension value to another dimension value. For instance, the attribution-flow diagram may indicate a number of users who interacted with digital content from a digital content campaign in an email-distribution channel, a direct-distribution channel, and a display-distribution channel and who subsequently interacted with digital content from the campaign in a social-network-distribution channel. An attribution-flow diagram may likewise indicate the converse as well—by indicating a number of users who interacted with digital content from a digital content campaign in a social-network-distribution channel and who subsequently interacted with digital content from the campaign in an email-distribution channel, a direct-distribution channel, and a display-distribution channel.

Figure 5A:
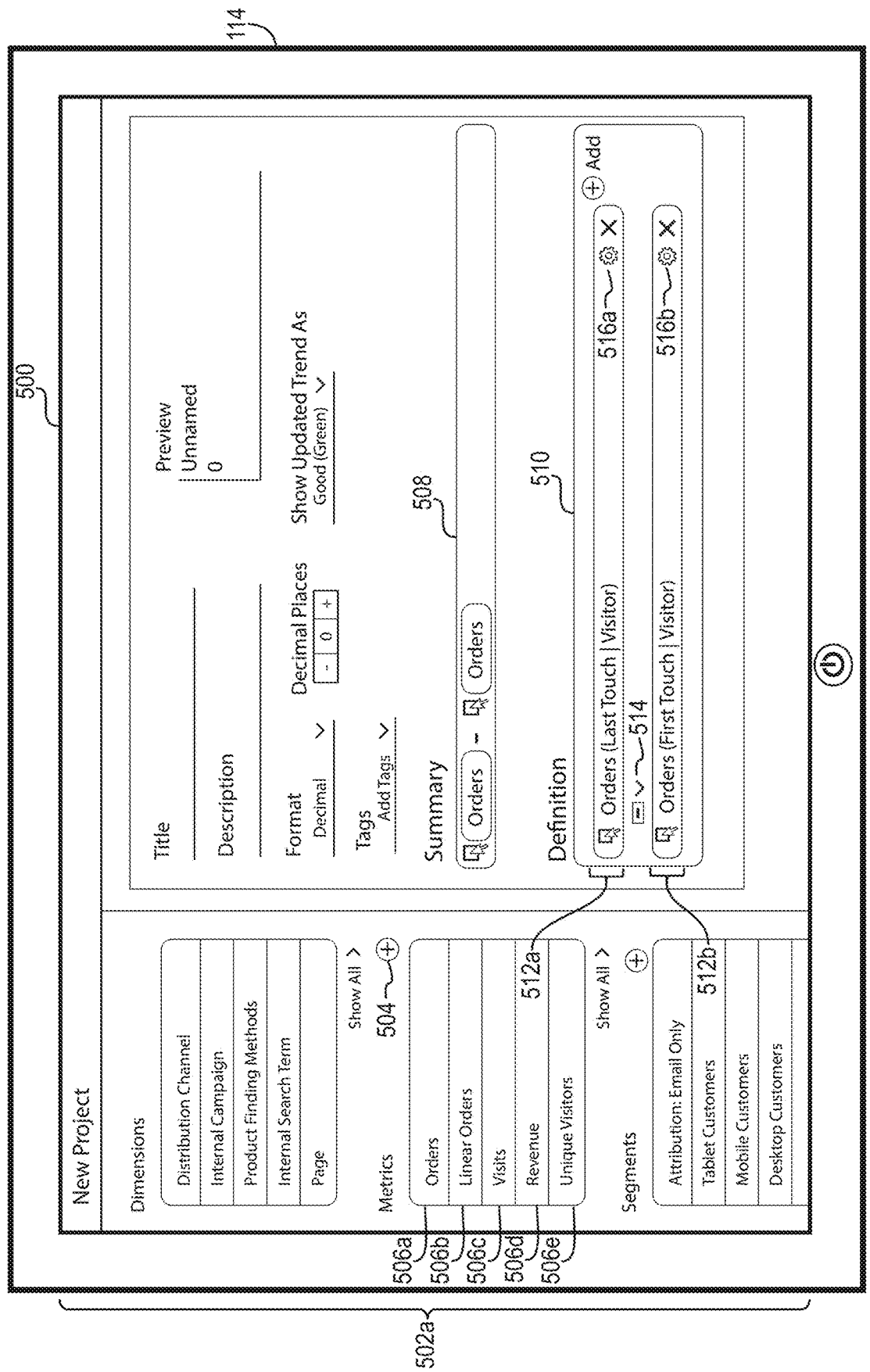
FIGS. 5A-5C illustrate graphical user interfaces of a client device presenting fields for creating an attribution-event function and attribution-distribution visualizations according to attribution models defined by attribution-event functions in accordance with one or more embodiments.
Figure 5B:
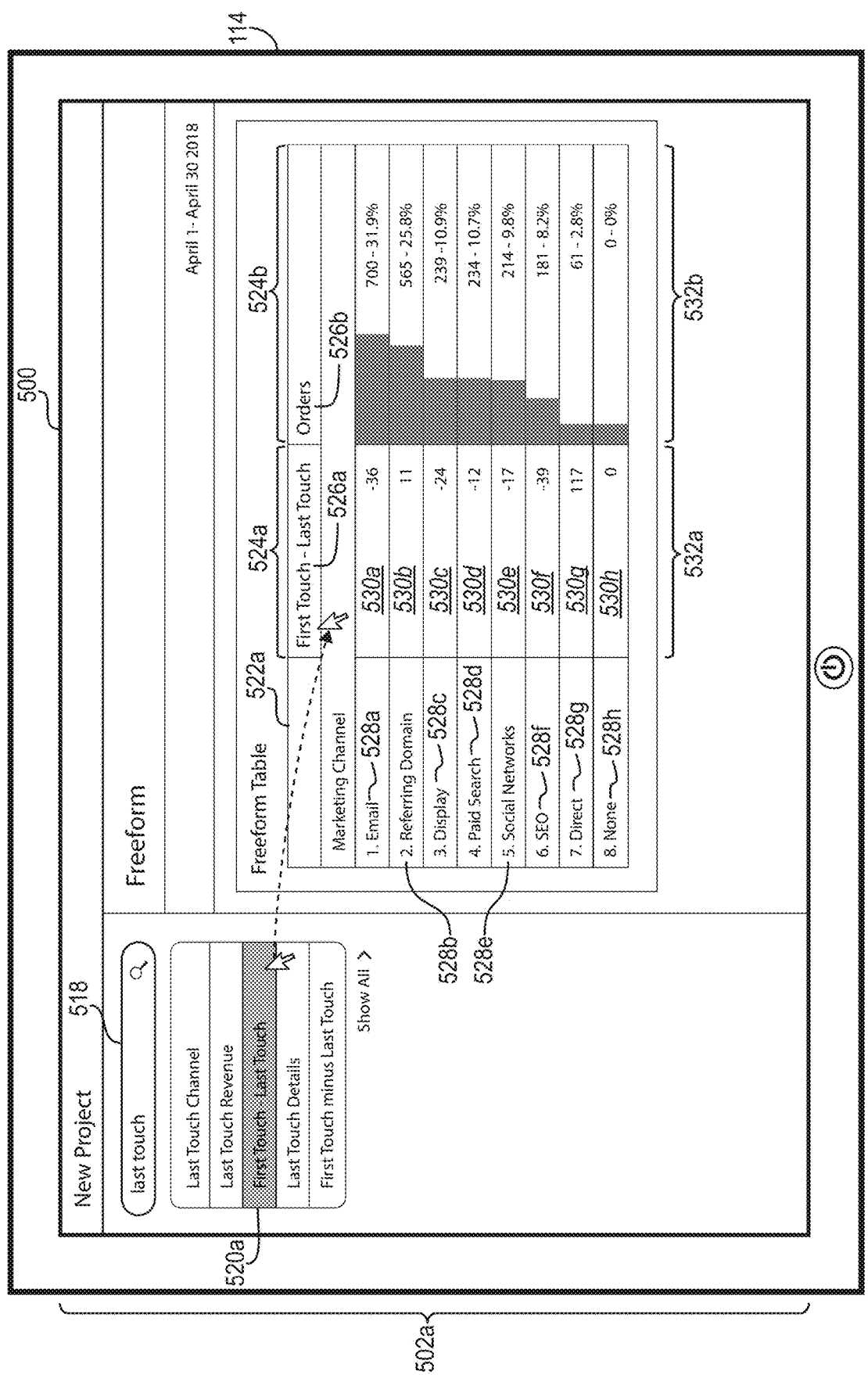
Figure 5C:
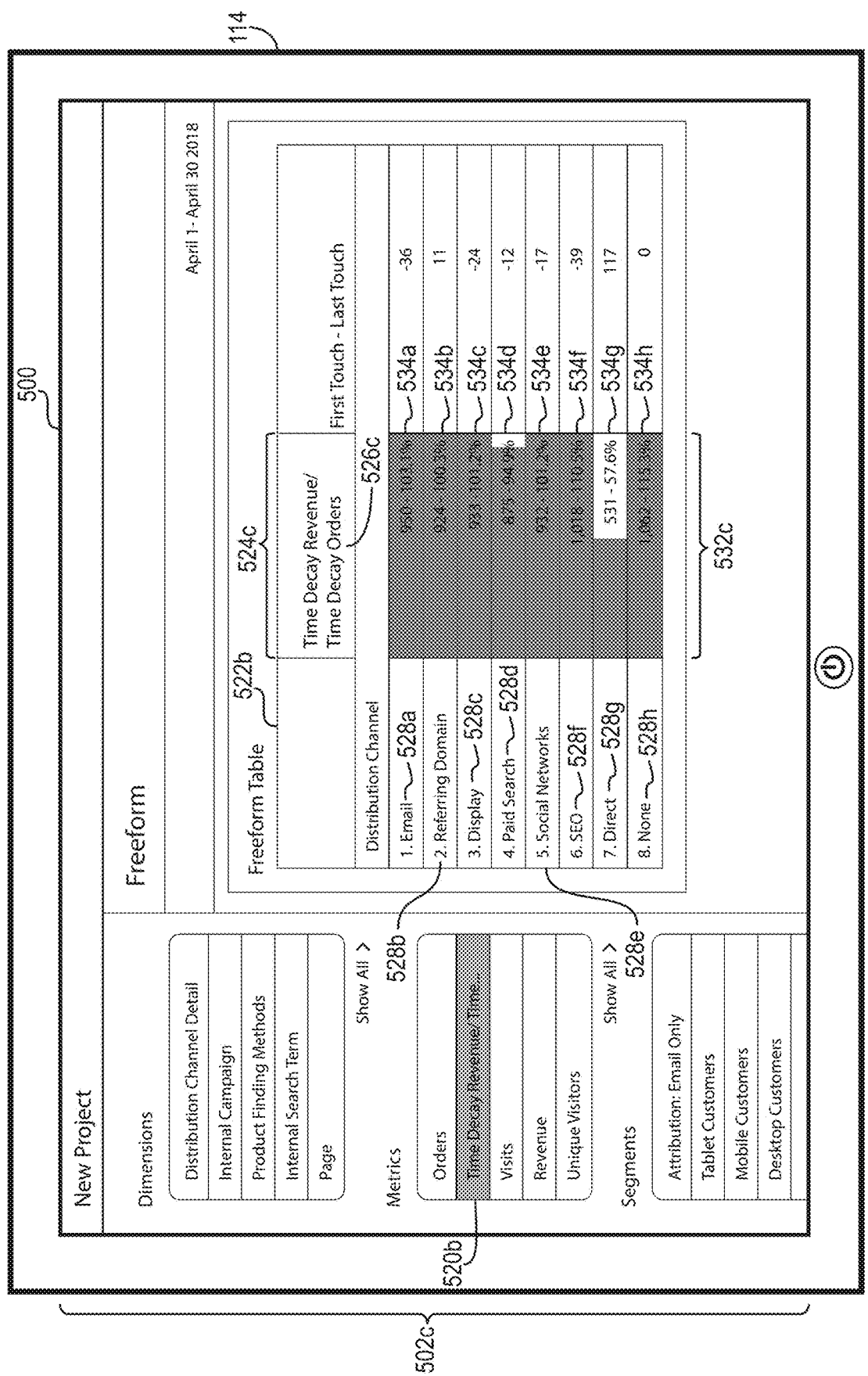

As indicated above, in some embodiments, the attribution-visualization system 106 can customize an attribution model by providing a user interface to define an attribution-event function comprising one or more attribution models and an operation. By using an attribution-event function, the attribution-visualization system 106 can apply a customized attribution model in combination with other parameters using relational operators (e.g., a subtraction operator). FIGS. 5A-5C illustrate the administrator device 114 presenting graphical user interfaces comprising fields for creating an attribution-event function and attribution-distribution visualizations according to attribution-event functions. By integrating one or more attribution-event functions as native components of various graphical user interfaces shown in FIGS. 5A-5C, the attribution-visualization system 106 implements such attribution-event functions as parameters of the following attribution visualizations, where the attribution-event functions operate as event categories. As described below, FIGS. 5A-5C depict graphical user interfaces from the perspective of the administrator device 114 implementing computer-executable instructions of the analytics application 116 to perform certain actions for the attribution-visualization system 106.

As shown in FIG. 5A, for instance, the attribution-visualization system 106 provides an attribution user interface 502*a* comprising fields to create an attribution-event function within a screen 500. For example, in some embodiments, upon receiving an indication from the administrator device 114 of a user selection of an event-category-addition option 504, the attribution-visualization system 106 generates the attribution user interface 502*a*. The event-category-addition option 504 enables the attribution-visualization system 106 to generate the attribution user interface 502*a*, define an attribution-event function as a custom attribution model, and use the attribution-event function as a parameter for an attribution visualization. The attribution-visualization system 106 can thus use an attribution-event function to generate attribution visualizations similar to how the attribution-visualization system 106 uses an event category.

As further shown in FIG. 5A, the attribution user interface 502*a* comprises an attribution-event-function summary 508 and an attribution-event-function builder 510. The attribution-visualization system 106 provides a summary of an attribution-event function within the attribution-event-function summary 508 based on user inputs indicated within the attribution-event-function builder 510. In some case, the attribution-event-function builder 510 includes one or more fields and one or more operation selectors to define an attribution-event function. As indicated by FIG. 5A, the attribution-event-function builder 510 includes parameter fields 512*a* and 512*b* in which the administrator device 114 can input parameters for an attribution-event function—including dimensions, event categories, attribution models, and lookback windows based on user input. As shown here, the administrator device 114 detects user input identifying a first event category, a first attribution model, and a first lookback window for entry within the parameter field 512a and a second event category, a second attribution model, and a second lookback window for entry within the parameter field 512b.

To facilitate selecting an event category, for example, the attribution user interface 502a includes event-category options 506a-506e corresponding to different event categories. As indicated by FIG. 5A, based on receiving an indication from the administrator device 114 of a selection of the event-category option 506a for both the parameter fields 512a and 512b, the attribution-visualization system 106 includes an event category corresponding to the event-category option 506a within the parameter fields 512a and 512b. Although not labelled with a reference number in FIG. 5A, the attribution user interface 502a includes dimension options corresponding to different dimensions and segment options corresponding to different segments of users. In certain embodiments, the attribution-visualization system 106 can include dimensions or segments of users within the parameter fields 512a and 512b based on selections of corresponding dimension options or segment options.

To facilitate selecting attribution models and lookback windows, the parameter fields 512a and 512b respectively include settings options 516a and 516b. For example, upon receiving an indication of user selection from the administrator device 114 of the settings option 516a, the attribution-visualization system 106 can provide an attribution-settings element (not shown) comprising options to select an attribution model and a lookback window for inclusion within the parameter field 512a. In some such embodiments, the attribution-settings element for the parameter field 512a functions similarly to the attribution-settings element 317 shown in FIG. 3C. As indicated by FIG. 5A, the settings option 516a corresponding to the parameter field 512a can likewise cause the attribution-visualization system 106 to provide an attribution-settings element comprising options to select an attribution model and a lookback window for inclusion within the parameter field 512b.

As shown in FIG. 5A, in addition to parameter fields, the attribution-event-function builder 510 includes an operation selector 514. The operation selector 514 includes options corresponding to various operators, such as an addition operator (+), a subtraction operator (−), a multiplication operator (×), and a division operator (÷). For example, in some embodiments, the operation selector 514 includes a drop-down menu comprising a selectable option corresponding to each of an addition operator, subtraction operation, multiplication operator, and division operator. When used within an attribution-event function, an operator relates an attribution model to another attribution model or other parameter (e.g., dimension, event category) by a mathematical operation. As shown by the operation selector 514 in FIG. 5A, for example, the administrator device 114 detects a selection of a subtraction operator as part of defining an attribution-event function.

Upon selection of parameters within the attribution-event-function builder 510, the attribution-visualization system 106 creates a selectable event category comprising the defined attribution-event function. As indicated by FIG. 5A, for example, the attribution-event-function builder 510 defines an attribution-event function that subtracts (i) orders according to a first attribution model from (ii) orders according to a second attribution model. As indicated above, however, the attribution-event-function builder 510 can define attribution-event functions combining one or more of various attribution models, dimensions, event categories, segments of users, or operations. For instance, in some embodiments, the attribution-event-function builder 510 can define hybrid attribution models using multiple attribution models and multiple operators (e.g., by defining an attribution-event function of: Orders (Time Decay (1 Week)|Visitor)×0.5+Orders (Linear|Visitor)×0.5).

As further indicated above, upon defining an attribution-event function, the attribution-visualization system 106 can use the attribution-event function as a parameter for an attribution visualization. FIG. 5B illustrates an example of the attribution-visualization system 106 receiving user input identifying an attribution-event function and generating an attribution visualization according to the attribution-event function. As shown in FIG. 5B, the attribution-visualization system 106 extemporaneously generates an attribution distribution 532a—in addition to an attribution distribution 532b—for display within an attribution user interface 502b based on a parameter representing an attribution-event function selected by the administrator 118.

As depicted in FIG. 5B, the attribution-visualization system 106 identifies the attribution-event function based on a search within a search field 518. In particular, the attribution-visualization system 106 generates an attribution-event-function option 520a based on the attribution-event function created in the attribution-event-function builder 510. The administrator device 114 subsequently provides the attribution-event-function option 520a based on terms entered within the search field 518. Upon selection of the attribution-event-function option 520a, the attribution-visualization system 106 creates or modifies a parameter (as if it were an event category) for an attribution distribution within a table 522a. As shown in FIG. 5B, for instance, upon receiving an indication from the administrator device 114 of a selection of the attribution-event-function option 520a—such as by a drag-and-drop action selecting the attribution-event-function option 520a—the attribution-visualization system 106 generates an event-category indicator 526a for a column 524a of the table 522a. The event-category indicator 526a identifies the attribution-event function as a parameter.

As further shown in FIG. 5B, the attribution-visualization system 106 generates the attribution distribution 532a for display within the attribution user interface 502b. The attribution distribution 532a comprises event-attribution differentials 530a-530h. The event-attribution differential 530a, for example, indicates a difference between (i) events attributed to a dimension value 528a according to the first attribution model and the first lookback window and (ii) events attributed to the dimension value 528a according to the second attribution model and the second lookback window. Each of the event-attribution differentials 530b-530h similarly indicate a difference between (i) events attributed to dimension values 528b-528h according to the first attribution model and the first lookback window and (ii) events attributed to the dimension values 528b-528h according to the second attribution model and the second lookback window.

FIG. 5B accordingly illustrates two different types of attribution distributions. In the column 524a of the table 522a, the attribution-visualization system 106 generates the attribution distribution 532a of the event-attribution differentials 530a-530h across the dimension values 528a-528h according to an attribution-event function. In a column 524b of the table 522a, by contrast, the attribution-visualization system 106 generates the attribution distribution 532*b* of events across the dimension values 528*a*-528*h* according to an attribution model. An event-category indicator 526*b* within the attribution user interface 502*b* indicates an event category for the events attributed in the attribution distribution 532*b*.

FIG. 5C provides a further example of the attribution-visualization system 106 receiving user input identifying an attribution-event function and generating an attribution visualization according to the attribution-event function. As shown in FIG. 5C, the attribution-visualization system 106 extemporaneously generates an attribution distribution 532*c* for display within an attribution user interface 502*c* based on an attribution-event function comprising different event categories, an attribution model, and an operator.

As suggested above, in some embodiments, the attribution-visualization system 106 can define relatively complex attribution-event functions. For example, in some embodiments, the attribution-visualization system 106 uses an attribution-event-function builder to define an attribution-event function comprising an operator that compares (i) a first event category, an attribution model, and a lookback window and (ii) a second event category, the attribution model, and the lookback window. By defining an attribution-event function using different event categories, the attribution-visualization system 106 can generate attribution visualizations comparing different event categories according to an attribution model. For example, as indicated by FIG. 5C, the attribution-visualization system 106 can generate an attribution visualization that compares revenue per orders according to an attribution model by defining an attribution-event function of: Revenue (Time Decay (1 Week)|Visitor)/Orders (Time Decay (1 Week)|Visitor).

As shown in FIG. 5C, the attribution-visualization system 106 generates an attribution-event-function option 520*b* based on such an attribution-event function comprising an operator that compares different event categories according to an attribution model. The administrator device 114 provides the attribution-event-function option 520*b* within the attribution user interface 502*c*. Upon selection of the attribution-event-function option 520*b*, the attribution-visualization system 106 creates or modifies a parameter (as if it were an event category) for an attribution distribution within a table 522*b*. As indicated by FIG. 5C, for instance, upon receiving an indication from the administrator device 114 of a selection of the attribution-event-function option 520*b*, the attribution-visualization system 106 generates an event-category indicator 526*c* for a column 524*c* of the table 522*b*. The event-category indicator 526*c* identifies the attribution-event function as a parameter.

As further shown in FIG. 5C, the attribution-visualization system 106 generates the attribution distribution 532*c* for display within the attribution user interface 502*c*. The attribution distribution 532*c* comprises event-category comparisons 534*a*-534*h*. The event-category comparison 534*a*, for example, indicates events from a first event category (e.g., revenue) per events from a second event category (e.g., orders) attributed to the dimension value 528*a* according to an attribution model and a lookback window. Each of the event-category comparisons 534*b*-534*h* similarly indicate events from the first event category per events from the second event category attributed to the dimension values 528*b*-528*h* according to the attribution model and the lookback window.

Figure 6:
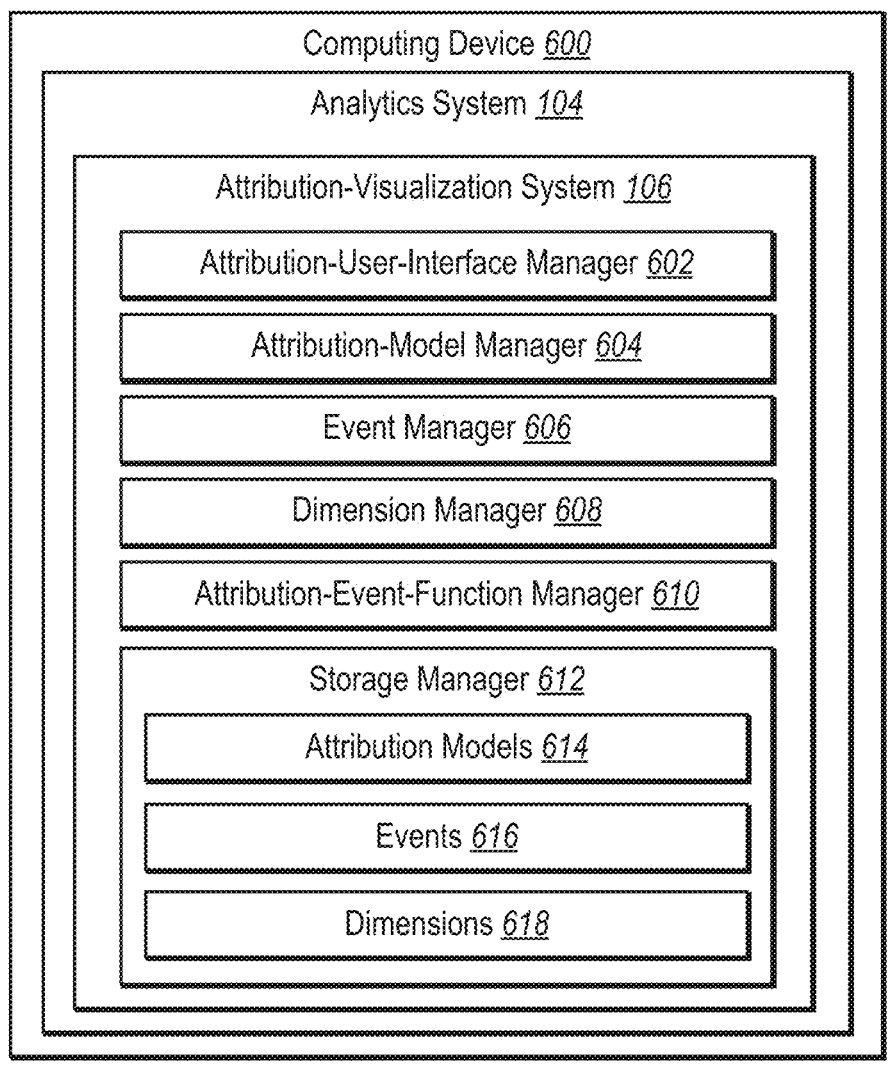
FIG. 6 illustrates a schematic diagram of the attribution-visualization system of FIG. 1 in accordance with one or more embodiments.

Turning now to FIG. 6, this figure provides additional detail regarding components and features of the attribution-visualization system 106. In particular, FIG. 6 illustrates a computing device 600 implementing the analytics system 104 and the attribution-visualization system 106. In some embodiments, the computing device 600 comprises one or more servers (e.g., the server(s) 102). In other embodiments, the computing device 600 comprises one or more client devices (e.g., the administrator device 114).

As shown in FIG. 6, the computing device 600 includes the analytics system 104. In some embodiments, the analytics system 104 uses its components to retrieve datasets corresponding to an attribution model, a dimension, and/or events, and to generate attribution distributions. Additionally, in some cases, the analytics system 104 facilitates the creation, collection, modification, accessing, storing, and/or deletion of datasets corresponding to attribution distributions, attribution models, dimensions, and/or events.

As further shown in FIG. 6, the computing device 600 includes the attribution-visualization system 106. The attribution-visualization system 106 includes, but is not limited to, an attribution-user-interface manager 602, an attribution-model manager 604, an event manager 606, a dimension manager 608, an attribution-event-function manager 610, and/or a storage manager 612. The following paragraphs describe each of these components in turn.

As just mentioned, the attribution-visualization system 106 includes the attribution-user-interface manager 602. In particular, the attribution-user-interface manager 602 manages, provides, presents, displays, an attribution user interface. The attribution-user-interface manager 602 further receives or detects user input or interactions with various elements of the attribution user interface. For example, the attribution-user-interface manager 602 detects user interaction with a dimension option, an event-category option, and/or an attribution-model option. Additionally, the attribution-user-interface manager 602 provides and modifies displays of attribution visualizations within the attribution user interface, such as representations of an attribution distribution in a comparison table, model-dimension-comparison visualization, or channel-overlap visualization.

As further shown in FIG. 6, the attribution-model manager 604 manages, maintains, implements, applies, and/or utilizes one or more attribution models. For example, the attribution-model manager 604 applies an attribution model to a particular dimension to attribute indicated events to dimension values across the dimension. The attribution-model manager 604 can further generate or modify attribution distributions across dimension values based on identifying new attribution models, new dimensions, and/or new event categories as described above. In some embodiments, the attribution-model manager 604 further communicates with the storage manager 612 to access, store, and/or categorize attribution models 614.

As further shown in FIG. 6, the event manager 606 manages, maintains, tracks, monitors, catalogues, and/or stores events (e.g., events associated with a digital content campaign). For example, the event manager 606 determines which user actions or touchpoints correspond to particular events within event categories. The event manager 606 further communicates with the storage manager 612 to access, store, and/or categorize events 616, including segments of users corresponding to the events 616. In some embodiments, the event manager 606 categorizes observed user actions or touchpoints as events within event categories stored within a database.

As further indicated by FIG. 6, the dimension manager 608 manages and/or maintains dimensions, including dimension values. For example, the dimension manager 608 communicates with the storage manager 612 to store dimensions 618 and corresponding dimension values. Accordingly, the dimension manager 608 can communicate with the attribution-model manager 604 and the event manager 606 to determine which events correspond to which dimension values.

As further shown in FIG. 6, the attribution-event-function manager 610 defines, manages, and/or maintains attribution-event functions. For example, in some embodiments, the attribution-event-function manager 610 provides fields and operation selectors to define an attribution-event function. Additionally, in some embodiments, the attribution-event-function manager 610 communicates with the storage manager 612 to store attribution-event functions in files, such as with attribution models 614 or with event categories for the events 616.

In one or more embodiments, each of the components of the attribution-visualization system 106 are in communication with one another using any suitable communication technologies. Additionally, the components of the attribution-visualization system 106 can be in communication with one or more other devices including one or more client devices described above. Although the components of the attribution-visualization system 106 are shown to be separate in FIG. 6, any of the subcomponents may be combined into fewer components, such as into a single component, or divided into more components as may serve a particular implementation. Furthermore, although the components of FIG. 6 are described in connection with the attribution-visualization system 106, at least some of the components for performing operations in conjunction with the attribution-visualization system 106 described herein may be implemented on other devices within the environment 100.

Each of the components 602-618 of the attribution-visualization system 106 can include software, hardware, or both. For example, the components 602-618 can include one or more instructions stored on a computer-readable storage medium and executable by processors of one or more computing devices, such as a client device or server device. When executed by the one or more processors, the computer-executable instructions of the attribution-visualization system 106 can cause the computing device(s) to perform the methods described herein. Alternatively, the components 602-618 can include hardware, such as a special-purpose processing device to perform a certain function or group of functions. Alternatively, the components 602-618 of the attribution-visualization system 106 can include a combination of computer-executable instructions and hardware.

Furthermore, the components 602-618 of the attribution-visualization system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 602-618 may be implemented as a stand-alone application, such as a desktop or mobile application. Furthermore, the components 602-618 may be implemented as one or more web-based applications hosted on a remote server. The components 602-618 may also be implemented in a suite of mobile device applications or "apps." To illustrate, the components 602-618 may be implemented in a software application, including, but not limited to, ADOBE MARKETING CLOUD, ADOBE CAMPAIGN, and ADOBE ANALYTICS. "ADOBE," "ANALYTICS," "CAMPAIGN," "AFTER EFFECTS," and "MARKETING CLOUD" are either registered trademarks or trademarks of Adobe Systems Incorporated in the United States and/or other countries.

Figure 7:
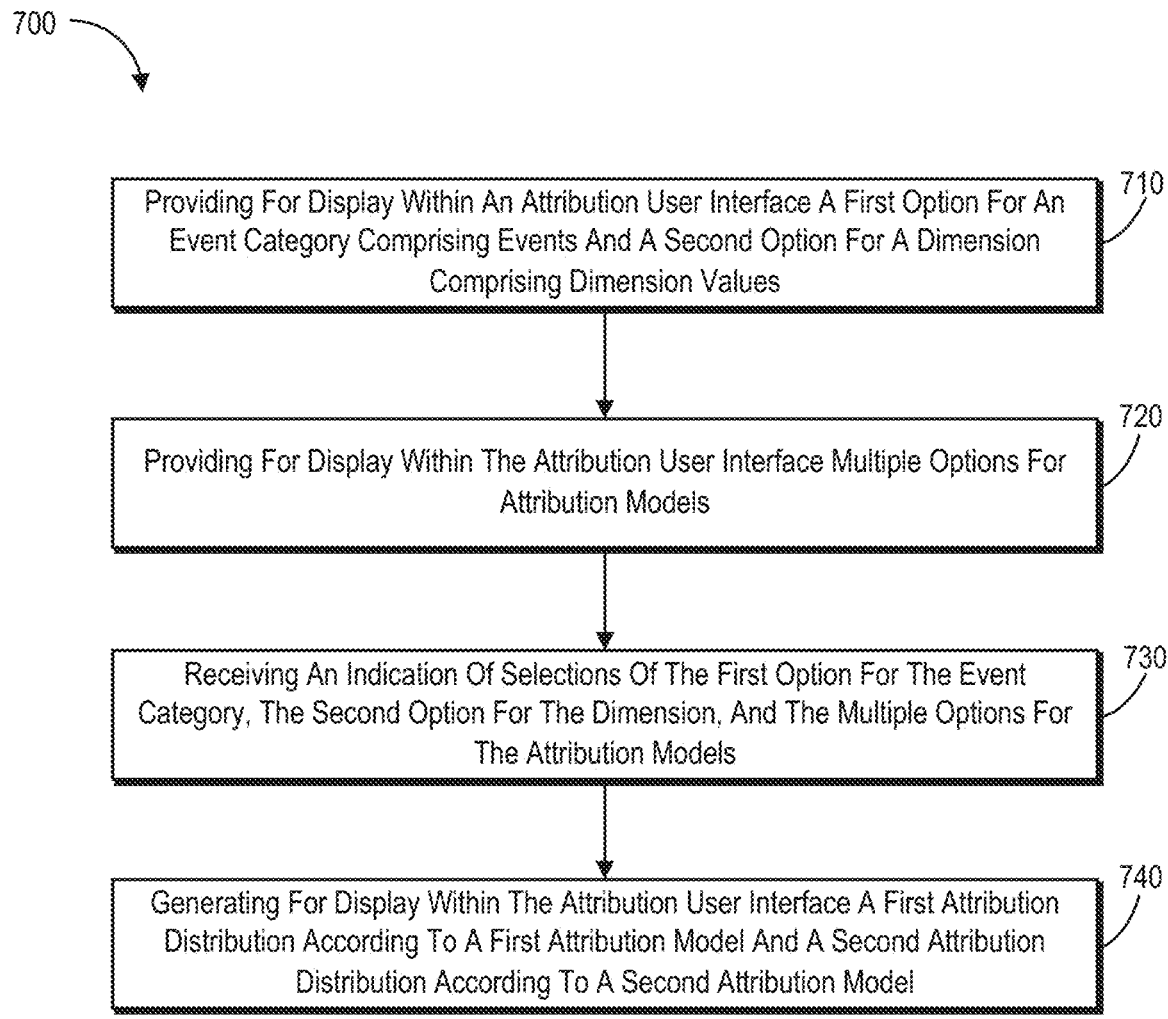
FIG. 7 illustrates a flowchart of a series of acts for generating visualizations for a first attribution distribution and a second attribution distribution based on different attribution models in accordance with one or more embodiments.

Turning now to FIG. 7, this figure illustrates a flowchart of a series of acts 700 of generating visualizations for a first attribution distribution and a second attribution distribution based on different attribution models in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer readable storage medium can comprise instructions that, when executed by one or more processors, cause a computing device to perform the acts depicted in FIG. 7. In still further embodiments, a system can perform the acts of FIG. 7.

As shown in FIG. 7, the acts 700 include an act 710 of providing for display within an attribution user interface a first option for an event category comprising events and a second option for a dimension comprising dimension values. In particular, in some embodiments, the act 710 includes providing for display within an attribution user interface a first option for an event category comprising a plurality of events and a second option for a dimension comprising a plurality of dimension values.

As further shown in FIG. 7, the acts 700 include an act 720 of providing for display within the attribution user interface multiple options for attribution models. In particular, in some embodiments, the act 720 includes providing for display within the attribution user interface a first attribution-model option corresponding to a first attribution model and a second attribution-model option corresponding to a second attribution model.

In some embodiments, each of the first attribution model and the second attribution model comprise one of a first-touch model, a last-touch model, a linear model, a participation model, a same-touch model, a U-shaped model, a J-curve model, an inverse-J model, a time-decay model, or a custom-attribution model.

As further shown in FIG. 7, the acts 700 include an act 730 of receiving an indication of selections of the first option for the event category, the second option for the dimension, and the multiple options for the attribution models. For example, in certain implementations, the act 730 includes receiving an indication of a selection of the first option for the event category and a selection of the second option for the dimension for visualization within the attribution user interface.

As further shown in FIG. 7, the acts 700 include an act 740 of generating for display within the attribution user interface a first attribution distribution according to a first attribution model and a second attribution distribution according to a second attribution model. For example, in certain implementations, the act 730 includes generating for display within the attribution user interface a first attribution distribution of the plurality of events across the plurality of dimension values according to a first attribution model and a second attribution distribution of the plurality of events across the plurality of dimension values according to a second attribution model.

In addition to the acts 710-740, the acts 700 further include receiving user input defining an attribution-event function comprising an initial attribution model and an operation; and generating an attribution model to utilize as the first attribution model based on the attribution-event function comprising the initial attribution model and the operation.

Figure 8:
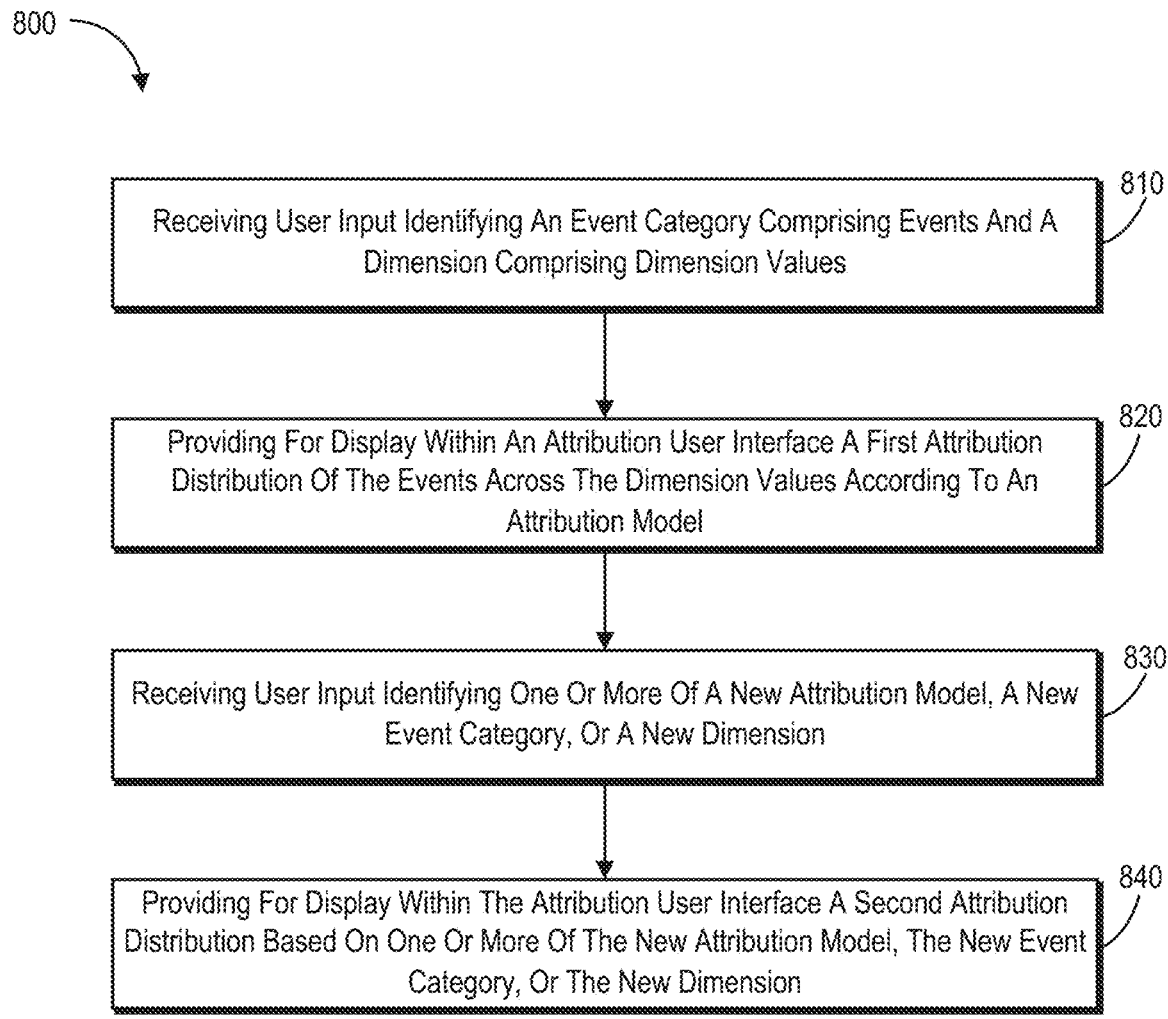
FIG. 8 illustrates a flowchart of a series of acts for generating visualizations for a first attribution distribution and a second attribution distribution based on one or more attribution models, event categories, and dimensions in accordance with one or more embodiments.

Turning now to FIG. 8, this figure illustrates a flowchart of a series of acts 800 of generating visualizations for a first attribution distribution and a second attribution distribution based on one or more attribution models, event categories, and dimensions in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable storage medium can comprise instructions that, when executed by one or more processors, cause a computing device to perform the acts depicted in FIG. 8. In still further embodiments, a system can perform the acts of FIG. 8.

As shown in FIG. 8, the acts 800 include an act 810 of receiving user input identifying an event category comprising events and a dimension comprising dimension values. In particular, in some embodiments, the act 810 includes receiving user input identifying an event category comprising a plurality of events and a dimension comprising a plurality of dimension values for visualization within an attribution user interface.

As further shown in FIG. 8, the acts 800 include an act 820 of providing for display within an attribution user interface a first attribution distribution of the events across the dimension values according to an attribution model. For example, in some embodiments, the act 820 includes, based on the user input, providing for display within the attribution user interface a first attribution distribution of the plurality of events across the plurality of dimension values according to an attribution model.

As suggested above, in certain implementations, providing for display within the attribution user interface the first attribution distribution comprises providing for display within the attribution user interface an attribution distribution that attributes a first event to a first dimension value according to the attribution model and a second event to a second dimension value according to the attribution model.

As further shown in FIG. 8, the acts 800 include an act 830 of receiving user input identifying one or more of a new attribution model, a new event category, or a new dimension and an act 840 of providing for display within the attribution user interface a second attribution distribution based on one or more of the new attribution model, the new event category, or the new dimension.

As suggested above, in certain implementations, the acts 800 further include provide for display within the attribution user interface selectable options corresponding to new attribution models. In some such implementations, providing for display within the attribution user interface the second attribution distribution comprises based on receiving an indication of a selection of a selectable option for a new attribution model, providing for display within the attribution user interface a modified attribution distribution that attributes the first event to the second dimension value according to the new attribution model. By contrast, in some embodiments, the acts 800 further include providing for display within the attribution user interface an adjusted attribution distribution that attributes a new event to a dimension value from the plurality of dimension values according to the new attribution model. Similarly, in some cases, the acts 800 further include providing for display within the attribution user interface an adjusted attribution distribution that attributes an event from the plurality of events to a new dimension value according to the new attribution model.

Additionally, in certain implementations, providing for display within the attribution user interface the second attribution distribution comprises providing a modified attribution distribution comprising: the plurality of events across the plurality of dimension values according to the new attribution model based on user selection of the new attribution model; a new plurality of events corresponding to the new event category across the plurality of dimension values according to the attribution model based on user selection of the new event category; or the plurality of events across a new plurality of dimension values corresponding to the new dimension according to the attribution model based on user selection of the new dimension.

Alternatively, in some embodiments, providing for display within the attribution user interface the second attribution distribution comprises providing both the first attribution distribution and the second attribution distribution for display within the attribution user interface. Relatedly, in some embodiments, the acts 800 further include providing both the first attribution distribution and the second attribution distribution for presentation within one or more of: a comparison table correlating the first attribution distribution with the second attribution distribution; a model-dimension-comparison visualization grouping attributions of one or more events attributed to a first dimension value according to both the attribution model and the new attribution model and attributions of one or more events attributed to a second dimension value according to both the attribution model and the new attribution model; or a dimension-overlap visualization indicating an attribution overlap between the attribution model and the new attribution model by attributing a subset of events from the plurality of events to both a first dimension value according to the attribution model and to a second dimension value according to the new attribution model.

In some implementations, the acts 800 further include receiving the user input identifying the new event category by receiving an indication of a segment of users corresponding to the event category; and based on receiving the indication of the segment of users, providing for display within the attribution user interface the second attribution distribution by providing a modified attribution distribution that attributes a subset of events from the plurality of events corresponding to the segment of users to the dimension values according to the attribution model.

As suggested above, in some embodiments, the acts 800 further include receiving the user input identifying the new dimension by receiving an indication of a dimension filter that identifies a subset of dimension values from the plurality of dimension values; and based on the dimension filter, providing for display within the attribution user interface the second attribution distribution by providing a modified attribution distribution of a subset of events from the plurality of events across the subset of dimension values according to the attribution model.

As noted above, in certain implementations, the attribution-visualization system 106 uses an attribution-event function. Accordingly, in some embodiments, the acts 800 further include receiving user input identifying the new attribution model by receiving an input defining an attribution-event function comprising a first attribution model and an operation; generating the new attribution model based on the attribution-event function comprising the first attribution model and the operation; and providing for display within the attribution user interface the second attribution distribution according to the new attribution model. In some such embodiments, receiving the input defining the attribution-event function comprises receiving the input defining the attribution-event function comprising the first attribution model, a second attribution model, and the operation; and generating the new attribution model comprises generating the new attribution model based on the attribution-event function comprising the first attribution model, the second attribution model, and the operation. Relatedly, in some implementations, the acts 800 further include receiving user input defining an attribution-event function comprising an initial attribution model and an operation; and generating the attribution model based on the attribution-event function comprising the initial attribution model and the operation.

As also noted above, in some embodiments, the attribution-visualization system 106 filters attribution distributions by a segment of users. Accordingly, in some implementations, the acts 800 further include providing for display within the attribution user interface a selectable-event-category option for the event category and a selectable-dimension option for the dimension; and receiving the user input identifying the event category comprising the plurality of events for visualization within the attribution user interface by receiving an indication of a user selection of the selectable-event-category option; and receiving the user input identifying the dimension comprising the plurality of dimension values for visualization within the attribution user interface by receiving an indication of a user selection of the selectable-dimension option for the dimension.

As a further example, in some embodiments, the acts 800 further include receiving additional user input identifying a segment of users corresponding to the event category; determining that the first event corresponds to the segment of users and that the second event does not correspond to the segment of users; and based on the first event corresponding to the segment of users and the second event not corresponding to the segment of users, providing for display within the attribution user interface a segmented attribution distribution that attributes the first event to the second dimension value according to the new attribution model and that omits an attribution for the second event.

In addition (or in the alternative) to the acts describe above, in some embodiments, the acts 700 (or the acts 800) include a step for dynamically modifying the attribution user interface to display different attribution distributions of the plurality of events across the plurality of dimension values according to one or more attribution models. As described with reference to FIG. 2, the algorithm and acts for generating a first attribution distribution 210; identifying a new attribution model 212, identifying a new event category 214, or identifying a new dimension 216; and generating a second attribution distribution 218 can comprise the corresponding acts for dynamically modifying the attribution user interface to display different attribution distributions of the plurality of events across the plurality of dimension values according to one or more attribution models.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 9:
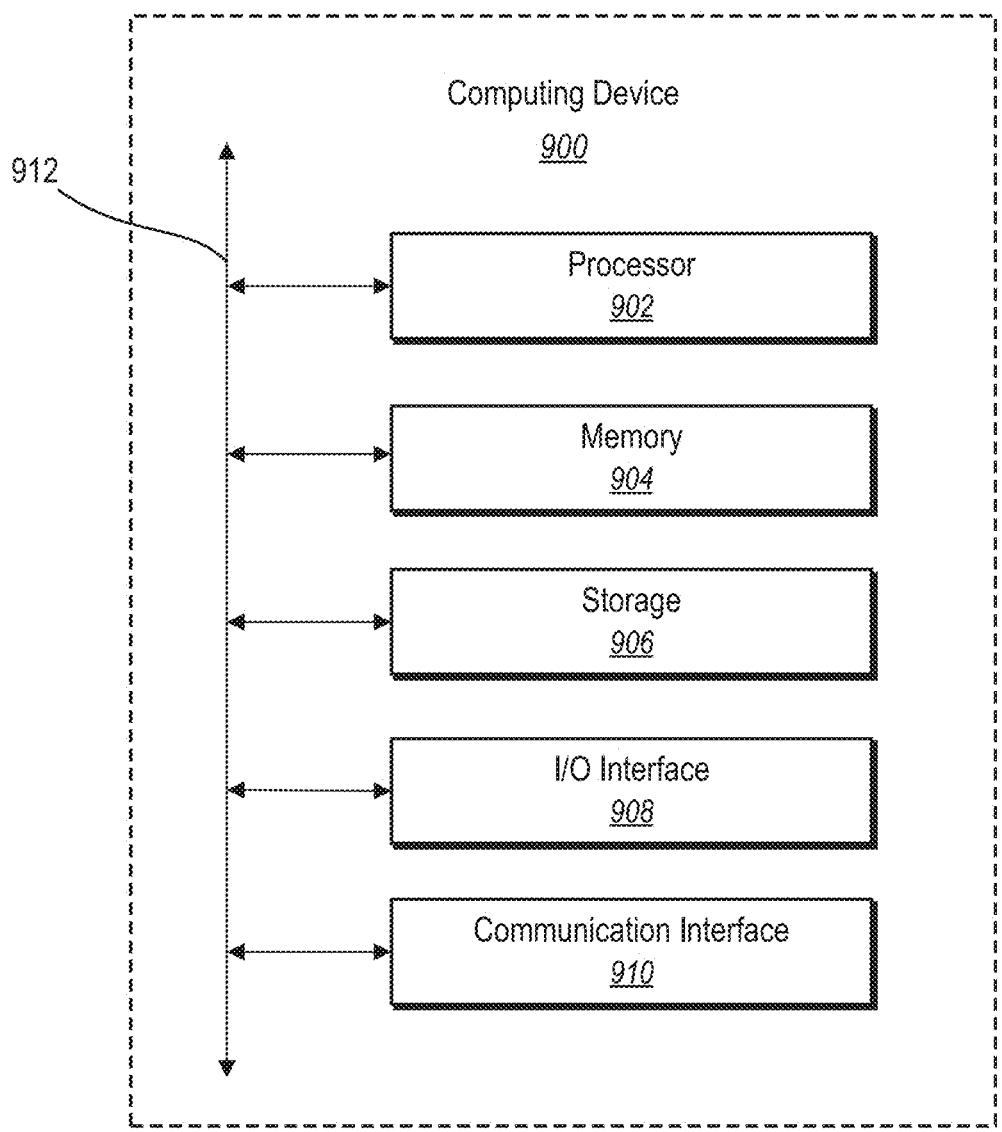
FIG. 9 illustrates a block diagram of an exemplary computing device for implementing one or more embodiments of the present disclosure.

FIG. 9 illustrates a block diagram of exemplary computing device 900 that may be configured to perform one or more of the processes described above. As shown by FIG. 9, the computing device 900 can comprise a processor 902, a memory 904, a storage device 906, an I/O interface 908, and a communication interface 910, which may be communicatively coupled by way of a communication infrastructure 912. In certain embodiments, the computing device 900 can include fewer or more components than those shown in FIG. 9. Components of the computing device 900 shown in FIG. 9 will now be described in additional detail.

In one or more embodiments, the processor 902 includes hardware for executing instructions, such as those making up a computer program. As an example, and not by way of limitation, to execute instructions for digitizing real-world objects, the processor 902 may retrieve (or fetch) the instructions from an internal register, an internal cache, the memory 904, or the storage device 906 and decode and execute them. The memory 904 may be a volatile or non-volatile memory used for storing data, metadata, and programs for execution by the processor(s). The storage device 906 includes storage, such as a hard disk, flash disk drive, or other digital storage device, for storing data or instructions related to object digitizing processes (e.g., digital scans, digital models).

The I/O interface 908 allows a user to provide input to, receive output from, and otherwise transfer data to and receive data from computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example and not by way of limitation, the communication interface 910 may include a network interface controller ("NIC") or network adapter for communicating with an Ethernet or other wire-based network or a wireless NIC ("WNIC") or wireless adapter for communicating with a wireless network, such as a WI-FI.

Additionally, the communication interface 910 may facilitate communications with various types of wired or wireless networks. The communication interface 910 may also facilitate communications using various communication protocols. The communication infrastructure 912 may also include hardware, software, or both that couples components of the computing device 900 to each other. For example, the communication interface 910 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. A computer-implemented method for generating dynamic attribution user interfaces that integrate multiple attribution models comprising:
receiving user input via an attribution user interface identifying an event category comprising a plurality of events and a dimension comprising a plurality of dimension values for visualization within the attribution user interface;
based on the user input, providing for display within the attribution user interface a first attribution distribution comprising a depiction of the plurality of events distributed across the plurality of dimension values according to an attribution model that attributes events within the plurality of events to respective dimension values within the plurality of dimension values;
receiving user input via the attribution user interface identifying one or more of a new attribution model, a new event category, or a new dimension; and
providing for display within the attribution user interface a second attribution distribution based on one or more of the new attribution model, the new event category, or the new dimension.

2. The computer-implemented method of claim 1, further comprising:
providing for display within the attribution user interface options corresponding to attribution models; and
receiving an indication of a selection of an option for the attribution model from the attribution models.

3. The computer-implemented method of claim 1, wherein the attribution model comprises one of a first-touch model, a last-touch model, a linear model, a participation model, a same-touch model, a U-shaped model, a J-curve model, an inverse-J model, a time-decay model, or a custom-attribution model.

4. The computer-implemented method of claim 1, further comprising:
receiving user input defining an attribution-event function comprising an initial attribution model and an operation; and
generating the attribution model based on the attribution-event function comprising the initial attribution model and the operation.

5. A non-transitory computer readable storage medium comprising instructions that, when executed by at least one processor, cause a computing device to:
receive user input via an attribution user interface identifying an event category comprising a plurality of events and a dimension comprising a plurality of dimension values for visualization within the attribution user interface;
based on the user input, provide for display within the attribution user interface a first attribution distribution comprising a depiction of the plurality of events distributed across the plurality of dimension values according to an attribution model that attributes events within the plurality of events to respective dimension values within the plurality of dimension values;
receive user input via the attribution user interface identifying one or more of a new attribution model, a new event category, or a new dimension; and
provide for display within the attribution user interface a second attribution distribution based on one or more of the new attribution model, the new event category, or the new dimension.

6. The non-transitory computer readable storage medium of claim 5, further comprising instructions that, when executed by the at least one processor, cause the computing device to provide the second attribution distribution for display by providing a modified attribution distribution comprising:
the plurality of events distributed across the plurality of dimension values according to the new attribution model based on user selection of the new attribution model;
a new plurality of events corresponding to the new event category distributed across the plurality of dimension values according to the attribution model based on user selection of the new event category; or
the plurality of events distributed across a new plurality of dimension values corresponding to the new dimension according to the attribution model based on user selection of the new dimension.

7. The non-transitory computer readable storage medium of claim 5, further comprising instructions that, when executed by the at least one processor, cause the computing device to:
receive the user input identifying the new event category by receiving an indication of a segment of users corresponding to the event category; and
based on receiving the indication of the segment of users, provide the second attribution distribution for display by providing a modified attribution distribution that attributes a subset of events from the plurality of events corresponding to the segment of users to the plurality of dimension values according to the attribution model.

8. The non-transitory computer readable storage medium of claim 5, further comprising instructions that, when executed by the at least one processor, cause the computing device to:
receive the user input identifying the new dimension by receiving an indication of a dimension filter that identifies a subset of dimension values from the plurality of dimension values; and
based on the dimension filter, provide the second attribution distribution for display by providing a modified attribution distribution of a subset of events from the plurality of events across the subset of dimension values according to the attribution model.

9. The non-transitory computer readable storage medium of claim 5, further comprising instructions that, when executed by the at least one processor, cause the computing device to provide the second attribution distribution for display by providing both the first attribution distribution and the second attribution distribution for simultaneous display together within the attribution user interface.

10. The non-transitory computer readable storage medium of claim 9, further comprising instructions that, when executed by the at least one processor, cause the computing device to provide both the first attribution distribution and the second attribution distribution for simultaneous display within one or more of:
a comparison table correlating the first attribution distribution with the second attribution distribution; or
a model-dimension-comparison visualization grouping attributions of one or more events attributed to a first dimension value according to both the attribution model and the new attribution model and attributions of one or more events attributed to a second dimension value according to both the attribution model and the new attribution model.

11. The non-transitory computer readable storage medium of claim 5, further comprising instructions that, when executed by the at least one processor, cause the computing device to:

receive user input identifying the new attribution model by receiving an input defining an attribution-event function comprising a first attribution model and an operation;

generate the new attribution model based on the attribution-event function comprising the first attribution model and the operation; and provide the second attribution distribution for display according to the new attribution model.

12. The non-transitory computer readable storage medium of claim 11, further comprising instructions that, when executed by the at least one processor, cause the computing device to:

receive the input defining the attribution-event function comprising the first attribution model, a second attribution model, and the operation; and generate the new attribution model based on the attribution-event function comprising the first attribution model, the second attribution model, and the operation.

13. The non-transitory computer readable storage medium of claim 5, further comprising instructions that, when executed by the at least one processor, cause the computing device to:

provide for display within the attribution user interface a selectable-event-category option for the event category and a selectable-dimension option for the dimension;

receive the user input identifying the event category comprising the plurality of events for visualization within the attribution user interface by receiving an indication of a user selection of the selectable-event-category option; and receive the user input identifying the dimension comprising the plurality of dimension values for visualization within the attribution user interface by receiving an indication of a user selection of the selectable-dimension option for the dimension.

14. A system comprising:

at least one processor; and at least one non-transitory computer memory comprising attribution models, dimensions, event categories, and instructions that, when executed by the at least one processor, cause the system to:

receive user input via an attribution user interface identifying an event category comprising a plurality of events and a dimension comprising a plurality of dimension values for visualization within the attribution user interface;

based on the user input, provide for display within the attribution user interface an attribution distribution that includes a first event attributed to a first dimension value according to an attribution model and a second event attributed to a second dimension value according to the attribution model, wherein the attribution model attributes events within the plurality of events to respective dimension values within the plurality of dimension values;

provide for display within the attribution user interface selectable options corresponding to new attribution models that each attribute events within the plurality of events to respective dimension values within the plurality of dimension values differently; and based on receiving an indication of a selection of a selectable option for a new attribution model, provide for display within the attribution user interface a modified attribution distribution that attributes the first event to the second dimension value according to the new attribution model.

15. The system of claim 14, further comprising instructions that, when executed by the at least one processor, cause the system to concurrently provide for display within the attribution user interface both the attribution distribution and the modified attribution distribution.

16. The system of claim 14, further comprising instructions that, when executed by the at least one processor, cause the system to:

receive additional user input identifying a new event category; and provide for display within the attribution user interface an adjusted attribution distribution that attributes a new event from the new event category to a dimension value from the plurality of dimension values according to the new attribution model.

17. The system of claim 14, further comprising instructions that, when executed by the at least one processor, cause the system to:

receive additional user input identifying a new dimension; and provide for display within the attribution user interface an adjusted attribution distribution that attributes an event from the plurality of events to a new dimension value from the new dimension according to the new attribution model.

18. The system of claim 14, further comprising instructions that, when executed by the at least one processor, cause the system to:

receive additional user input identifying a segment of users corresponding to the event category;

determine that the first event corresponds to the segment of users and that the second event does not correspond to the segment of users; and based on the first event corresponding to the segment of users and the second event not corresponding to the segment of users, provide for display within the attribution user interface a segmented attribution distribution that attributes the first event to the second dimension value according to the new attribution model and that omits an attribution for the second event.

19. The system of claim 14, further comprising instructions that, when executed by the at least one processor, cause the system to:

receive user input defining an attribution-event function comprising an initial attribution model and an operation; and generate the attribution model based on the attribution-event function comprising the initial attribution model and the operation.

20. The system of claim 14, further comprising instructions that, when executed by the at least one processor, cause the system to provide for display within the attribution user interface a dimension-overlap visualization indicating an attribution overlap between the attribution model and the new attribution model by attributing a subset of events from the plurality of events to both the first dimension value according to the attribution model and to the second dimension value according to the new attribution model.

* * * * *